US008514375B2

United States Patent
Hsu et al.

(10) Patent No.: US 8,514,375 B2
(45) Date of Patent: Aug. 20, 2013

(54) DISTANCE-MEASURING DEVICE OF MEASURING DISTANCE ACCORDING TO VARIATION OF IMAGING LOCATION AND CALIBRATING METHOD THEREOF

(75) Inventors: En-Feng Hsu, Hsin-Chu (TW);
Chi-Chieh Liao, Hsin-Chu (TW);
Chih-Hung Lu, Hsin-Chu (TW);
Tsung-Yi Su, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 296 days.

(21) Appl. No.: 12/842,045

(22) Filed: Jul. 23, 2010

(65) Prior Publication Data
US 2011/0069299 A1 Mar. 24, 2011

(30) Foreign Application Priority Data

Sep. 23, 2009 (TW) .............................. 98132086 A

(51) Int. Cl.
*G01C 3/08* (2006.01)
(52) U.S. Cl.
USPC ......... 356/4.02; 356/3.01; 356/4.01; 356/4.1; 356/5.01
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,946,081 | A | 8/1999 | Lai |
| 6,350,981 | B1 | 2/2002 | Uno |
| 6,370,331 | B1 | 4/2002 | Okubo |
| 6,549,058 | B1 | 4/2003 | Bondarev |
| 6,871,017 | B2 | 3/2005 | Numako |
| 7,006,142 | B2 | 2/2006 | Seo |
| 7,186,965 | B2 | 3/2007 | Schrey |
| 7,742,637 | B2 | 6/2010 | Xiao |
| 7,847,260 | B2 | 12/2010 | Inbar |
| 2002/0015144 | A1* | 2/2002 | Seo ............................. 356/5.01 |
| 2009/0009622 | A1 | 1/2009 | Yoshida |

FOREIGN PATENT DOCUMENTS

| TW | 374114 | 11/1999 |
| TW | 200514966 | 5/2005 |
| TW | 200900658 | 1/2009 |

\* cited by examiner

*Primary Examiner* — Luke Ratcliffe
(74) *Attorney, Agent, or Firm* — Winston Hsu; Scott Margo

(57) ABSTRACT

A distance-measuring device is utilized for measuring a measured distance between a measured object and the distance-measuring device. The distance-measuring device reduces the effect of a background light and a flicking light by removing the part corresponding to the background light and the flicking light from light-sensed signals generated by an image sensor of the distance-measuring device. In addition, the distance-measuring device calculates a calibrating parameter for calibrating an assemble-error angle of the distance-measuring device, according to an imaging location of a reflective light obtained by measuring a calibrating object with a predetermined distance. In this way, the distance-measuring device can correctly calculate out the measured distance.

25 Claims, 11 Drawing Sheets

DISTANCE-MEASURING DEVICE OF MEASURING DISTANCE ACCORDING TO VARIATION OF IMAGING LOCATION AND CALIBRATING METHOD THEREOF

BACKGROUND OF THE INVENTION

1. Field of the Invention

The present invention relates to a distance-measuring device, and more particularly, to a distance-measuring device of measuring distance according to variation of imaging location.

2. Description of the Prior Art

In the prior art, the distance-measuring device emits a detecting light to a measured object, and receives a reflecting light generated by the measured object reflecting the detecting light. The distance-measuring device calculates the distance between the measured object and the distance-measuring device according to the variation of the imaging location of the reflecting light. However, when the distance-measuring device senses the reflecting light from the measured object, the distance-measuring device is affected by the background light and the flicker phenomenon (for instance, the flicker of the fluorescent lamp caused by the frequency of the AC power supply) at the same time. Hence, the distance-measuring device calculates an incorrect measured distance because of the above-mentioned reason. Moreover, since the locations of the components of the distance-measuring device may shift or rotate due to the assembling error during the fabrication, the accuracy of the measured distance obtained by the distance-measuring device is further deteriorated, causing a great inconvenience.

SUMMARY OF THE INVENTION

The present invention provides a distance-measuring device of measuring distance according to variation of imaging location. The distance-measuring device has a lighting component, a first lens, and an image sensor. The lighting component is utilized for emitting a detecting light to a measured object for the measured object generating a reflecting light. The first lens is utilized for focusing a background light or the reflecting light. The image sensor is utilized for sensing an energy of a light focused by the first lens so as to generate M light-sensed signals. The distance-measuring device comprises a lighting/sensing controlling circuit, and a distance-calculating circuit. The lighting/sensing controlling circuit is utilized for controlling the lighting component to emit the detecting light and controlling the image sensor to sense the energy of the light focused by the first lens at the same time during a distance-sensing phase, so that the image sensor generates M first light-sensed signals, and for controlling the lighting component not to emit the detecting light and controlling the image sensor to sense the energy of the light focused by the first lens at the same time during a noise-sensing phase, so that the image sensor generates M second light-sensed signals. M represents a positive integer. The distance-calculating circuit is utilized for determining an imaging location of the reflecting light on the image sensor according to the M first light-sensed signals and the M second light-sensed signals, and calculating a measured distance between the distance-measuring device and the measured object according to the imaging location, a focus length of the first lens, and a predetermined distance between the lighting component and the image sensor.

The present invention further provides a calibrating method. The calibrating method is utilized for calibrating a distance-measuring device of measuring distance according to variation of imaging location. A lighting component of the distance-measuring device emits a detecting light to a measured object. The measured object reflects the detecting light to an image sensor of the distance-measuring device for imaging at a first imaging location. The distance-measuring device calculates a measured distance between the measured object and the distance-measuring device according to the first imaging location, a focus length of a first lens of the distance-measuring device, and a predetermined distance between the lighting component and the image sensor. The calibrating method comprises the lighting component of the distance-measuring device emitting the detecting light to a calibrating object, and the calibrating object reflecting the detecting light to the image sensor of the distance-measuring device for imaging at a second imaging location, calculating out a calibrating parameter for calibrating an assembling-error angle according to a known distance and the second imaging location, and the distance-measuring device calculating out the calibrated measured distance according to the calibrating parameter. A distance between the distance-measuring device and the calibrating object is the known distance.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a distance-measuring device of measuring distance according to the variation of the imaging location. The distance-measuring device of the present invention reduces the effect of the background light and the flicker phenomenon by removing the parts of background light and the flicking light from the light-sensed signals generated by the image sensor. In addition, the present invention further provides a calibrating method for calibrating the assembling error of the distance-measuring device, so as to improve the accuracy of measuring the distance.

Figure 1:
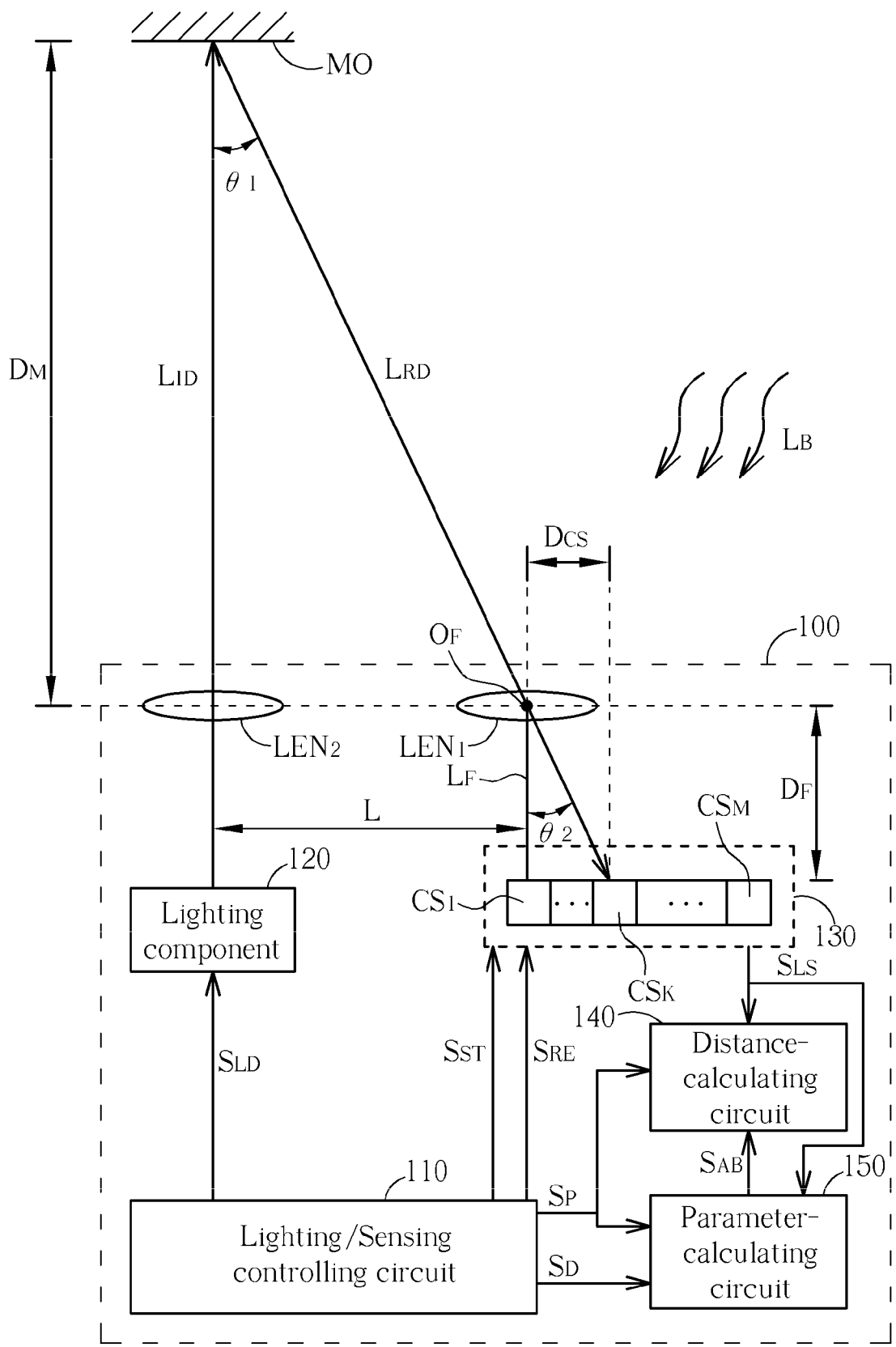
FIG. 1 and FIG. 2 are diagrams illustrating the structure and the operation principle of a distance-measuring device according to the present invention.
Figure 2:
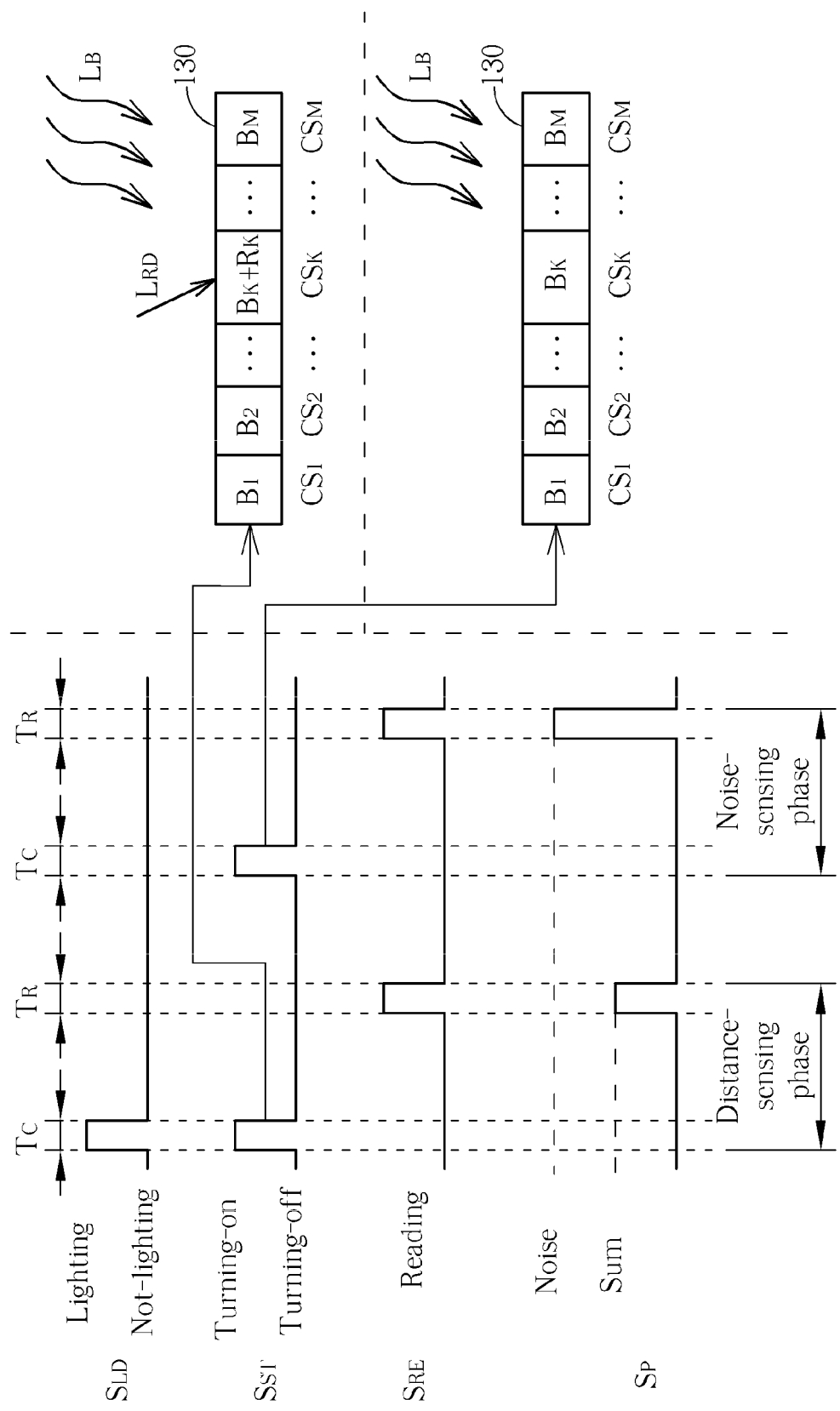

Please refer to FIG. 1 and FIG. 2. FIG. 1 and FIG. 2 are diagrams illustrating the structure and the operation principle of a distance-measuring device 100 according to the present invention. The distance-measuring device 100 measures distance according to the variation of the imaging location. More particularly, the distance-measuring device 100 measures the measured distance $D_M$ between the measured object MO and the distance-measuring device 100. The distance-measuring device 100 comprises a lighting/sensing controlling circuit 110, a lighting component 120, an image sensor 130, a distance-calculating circuit 140, a parameter-calculating circuit 150, and a lens $LEN_1$. The coupling relations between the components of the distance-measuring device 100 are shown in FIG. 1, and hence will not be repeated again for brevity.

The lighting/sensing controlling circuit 110 generates a lighting pulse signal $S_{LD}$, a shutter pulse signal $S_{ST}$, a phase signal $S_P$, a reading signal $S_{RE}$, and a known-distance signal $S_D$. Measuring the distance by the distance-measuring device 100 can be divided into two phases: 1. distance-sensing phase; 2. noise-sensing phase. During the distance-sensing phase, the lighting/sensing controlling circuit 110 generates the lighting pulse signal $S_{LD}$ representing "lighting" and the shutter pulse signal $S_{ST}$ representing "turning-on", wherein the pulse widths of the lighting pulse signal $S_{LD}$ representing "lighting" and the shutter pulse signal $S_{ST}$ representing "turning-on" are both equal to $T_C$. Then the lighting/sensing controlling circuit 110 generates the reading signal $S_{RE}$ representing "reading" and the phase signal $S_P$ representing "sum", wherein the pulse widths of the reading signal $S_{RE}$ representing "reading" and the phase signal $S_P$ representing "sum" are both equal to $T_R$. During the noise-sensing phase, the lighting/sensing controlling circuit 110 generates the shutter pulse signal $S_{ST}$ representing "turning-on" and the lighting pulse signal $S_{LD}$ represents "not-lighting" at the time, wherein the pulse width of the shutter pulse signal $S_{ST}$ representing "turning-on" during the noise-sensing phase is still equal to $T_C$. Then the lighting/sensing controlling circuit 110 generates the reading signal representing "reading" and the phase signal $S_P$ representing "noise", wherein the pulse widths of the reading signal $S_{RE}$ representing "reading" and the phase signal $S_P$ representing "noise" are still both equal to $T_R$.

The lighting component 120, according to the lighting pulse signal $S_{LD}$, emits a detecting light $L_{ID}$ to the measured object MO, so that the measured object MO generates a reflecting light $L_{RD}$. More particularly, when the lighting pulse signal $S_{LD}$ represents "lighting", the lighting component 120 emits the detecting light $L_{ID}$ to the measured object MO; when the lighting pulse signal $S_{LD}$ represents "not-lighting", the lighting component 120 does not emit the detecting light $L_{ID}$. In addition, the lighting component 120 can be a Light-Emitting Diode (LED) or a laser diode. When the lighting component 120 is an LED, the distance-measuring device 100 selectively comprises a lens $LEN_2$ for focusing the detecting light $L_{ID}$ emitting to the measured object MO.

The lens $LEN_1$ focuses a background light $L_B$ or the reflecting light $L_{RD}$ to the image sensor 130. The image sensor 130 comprises M sensing units $CS_1 \sim CS_M$. In the present embodiment, the M sensing units $CS_1 \sim CS_M$ are illustrated to be arranged side by side for example. The width of each sensing unit is equal to a pixel width $W_{PIX}$. That is, the total width of the M sensing units $CS_1 \sim CS_M$ arranged side by side is equal to $(M \times W_{PIX})$. The sensing units $CS_1 \sim CS_M$ sense the energy of the light focused by the lens $LEN_1$ according to the shutter pulse signal $S_{ST}$. More particularly, when the shutter pulse signal $S_{ST}$ represents "turning-on", the sensing units $CS_1 \sim CS_M$ sense the energy of the light (for example, the background light $L_B$ or the reflecting light $L_{RD}$) focused by the lens $LEN_1$ so as to generate the light-sensed signal; when the shutter pulse signal $S_{ST}$ represents "turning-off", the sensing units $CS_1 \sim CS_M$ do not sense the energy of the light focused by the lens $LEN_1$. For example, when the shutter pulse signal $S_{ST}$ represents "turning-on", the sensing unit $CS_1$ senses the energy of the light focused by the lens $LEN_1$ so as to generate the light-sensed signal $S_{LS1}$, the sensing unit $CS_2$ senses the energy of the light focused by the lens $LEN_1$ so as to generate the light-sensed signal $S_{LS2}$, ..., and the sensing unit $CS_M$ senses the energy of the light focused by the lens $LEN_1$ so as to generate the light-sensed signal $S_{LSM}$. In addition, when the reading signal $S_{RE}$ represents "reading", the sensing units $CS_1 \sim CS_M$ outputs the light-sensed signal $S_{LS1} \sim S_{LSM}$, respectively.

The distance-calculating circuit 140 comprises a plurality of storing units for respectively storing the light-sensed signals $S_{LS1} \sim S_{LSM}$ outputted by the sensing units $CS_1 \sim CS_M$. The distance-calculating circuit 140 sets the attributes of the received light-sensed signals according to the phase signal $S_P$. In the present embodiment, the distance-calculating circuit 140 is illustrated to comprise M storing units $M_1 \sim M_M$ for example. When the phase signal $S_P$ represents "sum", the storing units $M_1 \sim M_M$ set the attributes of the received light-sensed signals positive. That is, the received light-sensed signals $S_{LS1} \sim S_{LSM}$ are marked as positive light-sensed signals $S_{LS1+} \sim S_{LSM+}$ according to the phase signal $S_P$ representing "sum". When the phase signal $S_P$ represents "noise", the storing units $M_1 \sim M_M$ set the attributes of the received light-sensed signals negative. That is, the received light-sensed signals $S_{LS1} \sim S_{LSM}$ are marked as negative light-sensed signals $S_{LS1-} \sim S_{LSM-}$ according to the phase signal $S_P$ representing "noise". The distance-calculating circuit 140 calculates the measured distance $D_M$ according to the positive light-sensed signals $S_{LS1+} \sim S_{LSM+}$ and the negative light-sensed signals $S_{LS1-} \sim S_{LSM-}$. The operation principle of the distance-calculating circuit 140 calculating the measured distance $D_M$ is illustrated as below.

As shown in the left part of FIG. 2, during the distance-sensing phase, the lighting/sensing controlling circuit 110 generates the lighting pulse signal $S_{LD}$ represents "lighting" for the lighting component 120 emitting the detecting light $L_{ID}$ to the measured object MO, so that the measured object MO generates the reflecting light $L_{RD}$. Meanwhile, the lighting/sensing controlling circuit 110 generates the shutter pulse signal $S_{ST}$ representing "turning-on" for the sensing units $CS_1 \sim CS_M$ sensing the energy of the reflecting light $L_{RD}$ and the background light $L_B$, so that the sensing units $CS_1 \sim CS_M$ generate the light-sensed signals $S_{LS1} \sim S_{LSM}$ respectively. Then the lighting/sensing controlling circuit 110 outputs the reading signal $S_{RE}$ representing "reading" for the image sensor 130 outputting the light-sensed signals $S_{LS1} \sim S_{LSM}$ to the distance-calculating circuit 140, and the lighting/sensing controlling circuit 110 generates the phase signal $S_P$ representing "sum" for indicating the distance-calculating circuit 140 that the received light-sensed signals are the light-sensed signals of the distance-sensing phase. That is, the received light-sensed signals of the distance-calculating circuit 140 at the time are the positive light-sensed signals $S_{LS1+} \sim S_{LSM+}$. It is assumed that the reflecting light $L_{RD}$ is mainly focused on the sensing unit $CS_K$ during the distance-sensing phase (as shown in FIG. 2). The values of the received positive light-sensed signals $S_{LS1+} \sim S_{LSM+}$ are shown in the right upper part of FIG. 2. The sensing unit $CS_K$ senses the background light $L_B$ and the reflecting light $L_{RD}$ (that is, the measured object MO images on the sensing unit $CS_K$). Therefore, the light-sensed signal $S_{LSK+}$ is equal to the sum of the energy $B_K$, which is accumulated by the sensing unit $CS_K$ sensing the background light $L_B$, and the energy $R_K$, which is accumulated by the sensing unit $CS_K$ sensing the reflecting light $L_{RD}$. The other sensing units only receive the background light $L_B$. For example, the light-sensed signal $S_{LS1+}$ is equal to the energy $B_1$, which is accumulated by the sensing unit $CS_1$ sensing the background light $L_B$; the light-sensed signal $S_{LS2+}$ is equal to the energy $B_2$, which is accumulated by the sensing unit $CS_2$ sensing the background light $L_B$; . . . ; the light-sensed signal $S_{LSM+}$ is equal to the energy $B_M$, which is accumulated by the sensing unit $CS_M$ sensing the background light $L_B$.

As shown in the left part of FIG. 2, during the noise-sensing phase, the lighting/sensing controlling circuit 110 generates the shutter pulse signal $S_{ST}$ representing "turning-on" for the sensing units $CS_1$~$CS_M$ sensing the energy of the light focused by the lens $LEN_1$ so as to generate the light-sensed signals $S_{LS1}$~$S_{LSM}$. Meanwhile, the lighting/sensing controlling circuit 110 generates the lighting pulse signal $S_{LD}$ represents "not-lighting". Hence, the lighting component 120 does not emit the detecting light $L_{ID}$ to the measured object MO, so that the measured object MO does not generate the reflecting light $L_{RD}$. Then the lighting/sensing controlling circuit 110 outputs the reading signal $S_{RE}$ representing "reading" for the image sensor 130 outputting the light-sensed signals $S_{LS1}$~$S_{LSM}$ to the distance-calculating circuit 140, and the lighting/sensing controlling circuit 110 generates the phase signal $S_P$ representing "noise" for indicating the distance-calculating circuit 140 that the received light-sensed signals are the light-sensed signals of the noise-sensing phase at the time. That is, the received light-sensed signals of the distance-calculating circuit 140 are the negative light-sensed signals $S_{LS1-}$~$S_{LSM-}$. The values of the received positive light-sensed signals $S_{LS1-}$~$S_{LSM-}$ are shown in the right lower part of FIG. 2. The pulse width of shutter pulse signal $S_{ST}$ during the distance-sensing phase is equal to the pulse width of shutter pulse signal $S_{ST}$ during the noise-sensing phase (both are equal to $T_C$). Therefore, the parts, which corresponds to the background light $L_B$, of the light-sensed signals $S_{LS1}$~$S_{LSM}$ of the distance-sensing phase are equal to the parts, which corresponds to the background light $L_B$, of the light-sensed signals $S_{LS1}$~$S_{LSM}$ of the noise-sensing phase. In other words, the parts contributed by the background light $L_B$ of the positive light-sensed signals $S_{LS1+}$~$S_{LSM+}$ are equal to the parts contributed by the background light $L_B$ of the negative light-sensed signals $S_{LS1-}$~$S_{LSM-}$ (both are equal to $B_1$~$B_M$).

After the distance-sensing phase and the noise-sensing phase, the lighting/sensing controlling circuit 110 generates the phase signal $S_P$ representing "distance-calculating". Meanwhile, the distance-calculating circuit 140 deducts the negative light-sensed signals $S_{LS1-}$~$S_{LSM-}$ stored in the storing units from the positive light-sensed signals $S_{LS1+}$~$SLsM_+$ stored in the storing units. The distance-calculating circuit 140 finds out the storing units having the maximum stored value after the deduction and accordingly determines the imaging location of the reflecting light $L_{RD}$ on the image sensor 130. More particularly, the values of the storing units $M_1$~$M_M$ of the distance-calculating circuit 140 are respectively equal to the values of the negative light-sensed signals $S_{LS1-}$~$S_{LSM-}$ deducting from the positive light-sensed signals $S_{LS1+}$~$S_{LSM+}$. For instance, the storing unit $M_1$ stores the value of the negative light-sensed signal $S_{LS1-}$ deducting from the positive light-sensed signal $S_{LS1+}$. Since the positive light-sensed signal $S_{LS1+}$ and the negative light-sensed signal $S_{LS-}$ are both equal to $B_1$, the stored value of the storing unit $M_1$ after the deduction is equal to zero. The storing unit $M_2$ stores the value of the negative light-sensed signal $S_{LS2-}$ deducting from the positive light-sensed signal $S_{LS2+}$. Since the positive light-sensed signal $S_{LS2+}$ and the negative light-sensed signal $S_{LS2-}$ are both equal to $B_2$, the stored value of the storing unit $M_2$ after the deduction is equal to zero. Similarly, the storing unit $M_K$ stores the value of the negative light-sensed signal $S_{LSK-}$ deducting from the positive light-sensed signal $S_{LSK+}$. Since the positive light-sensed signal $S_{LSK+}$ is equal to $(R_K+B_K)$ and the negative light-sensed signal $S_{LSK-}$ is equal to $B_K$, the stored value of the storing unit $M_K$ after the deduction is equal to $R_K$. The storing unit $M_M$ stores the value of the negative light-sensed signal $S_{LSM-}$ deducting from the positive light-sensed signal $S_{LSM+}$. Since the positive light-sensed signal $S_{LSM+}$ and the negative light-sensed signal $S_{LSM-}$ are both equal to $B_M$, the stored value of the storing unit $M_M$ after the deduction is equal to zero. In other words, among the storing units $M_1$~$M_M$, the stored value of the storing unit $M_K$ is equal to $R_K$, and the stored value of the other sensing units are all equal to zero. Consequently, the distance-calculating circuit 140 determines the positive light-sensed signal stored in the storing unit $M_K$ has the energy corresponding to the reflecting light $L_{RD}$. Since the storing unit $M_K$ stores the light-sensed signal generated by the sensing unit $CS_K$, the distance-calculating circuit 140 determines the reflecting light $L_{RD}$ generated by the measured object MO is mainly focused on the sensing unit $CS_K$. In this way, the distance-calculating circuit 140 calculates the imaging location $D_{CS}$ of the reflecting light $L_{RD}$ of FIG. 1 according to the sensing unit $CS_K$ and the following formula:

$$D_{CS}=K \times W_{PIX} \quad (1);$$

In addition, since, in FIG. 1, the straight light $L_F$ formed between the focus point $O_{F1}$ of the lens $LEN_1$ and the sensing unit $CS_1$ is parallel to the detecting light $L_{ID}$, the included angle $\theta_1$ between the detecting light $L_{ID}$ and the reflecting light $L_{RD}$ is equal to the included angle $\theta_2$ between the straight line $L_F$ and the reflecting light $L_{RD}$. In other words, the relation between $\tan \theta_1$ and $\tan \theta_2$ is represented as the following formula:

$$\tan \theta_1 = L/D_M = \tan \theta_2 = D_{CS}/D_F \quad (2);$$

wherein L represents the predetermined distance between the lighting component 120 and the image sensor 130 (or between the detecting light $L_{ID}$ and the reflecting light $L_{RD}$); $D_{CS}$ represents the imaging location of the reflecting light $L_{RD}$; $D_F$ represent the focus length of the lens $LEN_1$. The measured distance $D_M$ is represented as the following formula according to the formula (2):

$$D_M=(D_F \times L)/D_{CS} \quad (3);$$

as a result, the distance-calculating circuit 140 calculates the imaging location $D_{CS}$ according to the formula (1), and then calculates the measured distance $D_M$ according to the predetermined distance L, the focus length $D_F$, and the formula (3).

In conclusion, in the distance-measuring device 100, during the distance-sensing phase, the lighting/sensing controlling circuit 110 controls the lighting component 120 to emit the detecting light $L_{ID}$ to the measured object MO. The storing units $M_1$~$M_M$ store the positive light-sensed signals $S_{LS1+}$~$S_{LSM+}$ generated by the sensing unit $CS_1$~$CS_M$ sensing the light (for instance, the reflecting light $L_{RD}$ and the background light $L_B$) focused by the lens $LEN_1$. During the noise-sensing phase, the lighting/sensing controlling circuit 110 controls the lighting component 120 not to emit the detecting light $L_{ID}$ to the measured object MO. The storing units $M_1 \sim M_M$ store the negative light-sensed signals $S_{LS1-} \sim S_{LSM-}$ generated by the sensing unit $CS_1 \sim CS_M$ sensing the light (for instance, the background light $L_B$) focused by the lens $LEN_1$. Then the stored values of the storing units $M_1 \sim M_M$ are equal to the values of the negative light-sensed signals $S_{LS1-} \sim S_{LSM-}$ deducting from the positive light-sensed signals $S_{LS1+} \sim S_{LSM+}$. Thus, the stored value of the storing unit $M_K$, corresponding to the sensing unit $CS_K$ where the reflecting light $L_{RD}$ is focused, is larger than the other storing units. In this way, the distance-calculating circuit 140 determines the reflecting light $L_{RD}$ is focused to the sensing unit $CS_K$, and accordingly calculates the imaging location $D_{CS}$ of the reflecting light $L_{RD}$. Therefore, the distance-calculating circuit 140 can calculate the measured distance $D_M$ according to the imaging location $D_{CS}$, the focus length $D_F$ of the lens $LEN_1$, and the predetermined distance L.

Furthermore, in the distance-measuring device 100, the distance-sensing phase and the noise-sensing phase can repeat over and over (for example, Y times), so that the storing units $M_1 \sim M_M$ store the positive light-sensed signals corresponding to the Y distance-sensing phases, and store the negative light-sensed signals corresponding to the Y noise-sensing phases. The parts of the positive light-sensed signals, which corresponds to the background light $L_B$ during each distance-sensing phase, are counteracted by the parts of the negative light-sensed signals, which corresponds to the background light $L_B$ during each noise-sensing phase. Hence, besides the value of the storing unit $M_K$, corresponding to the sensing unit $CS_K$ where the reflecting light $L_{RD}$ is focused, is equal to $(Y \times R_K)$, the values of the other storing units are all equal to zero. In this way, even the reflecting light $L_{RD}$ is so weak that the energy $R_K$ sensed by the sensing unit $CS_K$ is very small, the distance-measuring device 100 still can enlarge the difference between the value of the storing unit $M_K$ and the values of the other storing units by repeating the distance-sensing phase and the noise-sensing phase for several times (that is, Y is enlarged). In this way, in spite of the weak reflecting light $L_{RD}$, the distance-calculating circuit 140 still can correctly determine the storing unit $M_K$ having the maximum value, and accordingly calculates the imaging location of the reflecting light $L_{RD}$.

Figure 3:
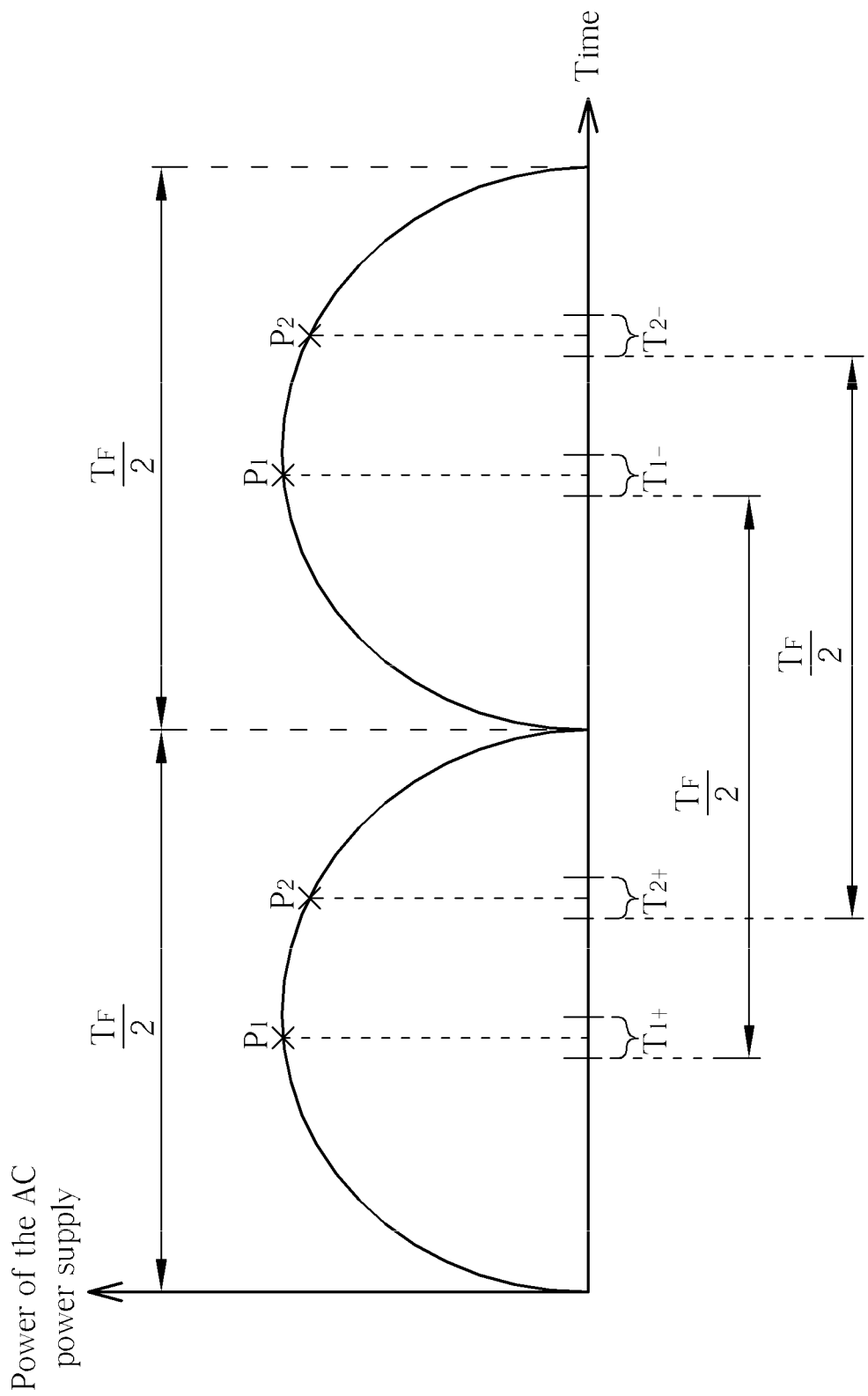
FIG. 3 is a diagram illustrating the operation principle of the distance-measuring device reducing the flicker phenomenon according to the present invention.

Please refer to FIG. 3. FIG. 3 is a diagram illustrating the operation principle of the distance-measuring device 100 reducing the flicker phenomenon. Since the power of the general indoor light sources are from the AC power supply, a part of the background light $L_B$ (which is referred as the flicking light $L_F$ hereinafter) flicks because of the frequency of the AC power supply. For example, the power of the indoor fluorescent lamp is from the AC power supply. Therefore, the light emitted by the fluorescent lamp is affected by the frequency of the AC power supply, so that the flicker phenomenon is generated. In FIG. 3, it is assumed that the cycle of the AC power supply (or the AC cycle) is $T_F$ (for example, the frequency of the AC power supply is 60 Hz, and the AC cycle is 0.0167 s). The power P of the AC power supply varies with time. Hence, the power of the flicking light $L_F$ varies as well. However, the varying cycle of the power P of the AC power supply is equal to a half of the AC cycle (that is, $T_F/2$). For example, when the time is T, the power P of the AC power supply is equal to $P_T$; when the time is $(T+T_F/2)$, the power P of the AC power supply is still equal to $P_T$. Since the power of the flicking light is proportional to the power P of the AC power supply, the varying cycle of the power of the flicking light $L_F$ is equal to a half of the AC cycle (that is, $T_F/2$) as well. In this way, in the distance-measuring device 100, the lighting/sensing controlling circuit 110 controls the time interval between the distance-sensing phases (for example, $T_{1+}$ and $T_{2+}$ shown in FIG. 3) and the noise-sensing phases (for example, $T_{1-}$ and $T_{2-}$ shown in FIG. 3) equal to a half of the AC cycle $T_F/2$ for reducing the effect of the flicker phenomenon. More particularly, the lighting/sensing controlling circuit 110 controls the sensing units $CS_1 \sim CS_M$ sensing the flicking light $L_F$ corresponding to the power $P_1$ (or $P_2$) of the AC power supply during the distance-sensing phase $T_{1+}$ (or $T_{2+}$), so that the parts of the positive light-sensed signals, which correspond to the flicking light $L_F$, are equal to $F_{11} \sim F_{M1}$ (or $F_{12} \sim F_{M2}$). The lighting/sensing controlling circuit 110 controls the time interval between the distance-sensing phase $T_{1+}$ (or $T_{2+}$) and the noise-sensing phase $T_{1-}$ (or $T_{2-}$) equal to a half of the AC cycle $T_F/2$ (for example, 0.0083 s). As a result, the power of the flicking light $L_F$ sensed by the sensing units $CS_1 \sim CS_M$ during the noise-sensing phase $T_{1-}$ (or $T_{2-}$) is equal to the power of the flicking light $L_F$ sensed by the sensing units $CS_1 \sim CS_M$ during the distance-sensing phase $T_{1+}$ (or $T_{2+}$). In this way, the parts, corresponding to the flicking light $L_F$, of the negative light-sensed signals generated by the sensing units $CS_1 \sim CS_M$ during the noise-sensing phase $T_{1-}$ (or $T_{2-}$) are equal to $F_{11} \sim F_{M1}$ (or $F_{12} \sim F_{M2}$) as well. Consequently, the parts, corresponding to the flicking light $L_F$, of the positive light-sensed signals of the distance-sensing phase $T_{1+}$ (or $T_{2+}$) are counteracted by the parts, corresponding to the flicking light $L_F$, of the negative light-sensed of the noise-sensing phase $T_{1-}$ (or $T_{2-}$) signals. In other words, besides the value of the storing unit $M_K$, which corresponds to the sensing unit $CS_K$ where the reflecting light $L_{RD}$ is focused, is equal to $R_K$, the values of the other storing units are all equal to zero. Hence, even the sensing units $CS_1 \sim CS_M$ sense the flicking light $L_F$, the lighting/sensing controlling circuit 110 still can reduce the effect of the flicker phenomenon by controlling the time interval between the distance-sensing phase and the noise-sensing phase equal to a half of the AC cycle ($T_F/2$), so that the distance-calculating circuit 140 correctly determines the imaging location $D_{CS}$ of the reflecting light $L_{RD}$ and accordingly calculates the measured distance $D_M$.

Since, when the distance-measuring device 100 is assembled during the fabrication, the locations of the components of the distance-measuring device 100 are affected by the assembling error, the distance-measuring device 100 is affected by the assembling error when the distance-measuring device 100 measures the distance. In the present invention, the parameter-calculating circuit 150 of the distance-measuring device 100 is utilized for calibrating the assembling error of the distance-measuring device 100. The operation principle of the parameter-calculating circuit 150 is illustrated as below.

The parameter-calculating circuit 150 receives the known-distance signal $S_D$ for obtaining a known distance $D_{C1}$ and a known distance $D_{C2}$, wherein the known distance $D_{C1}$ is the distance between a calibrating object $CO_1$ and the distance-measuring device 100, and the known distance $D_{C2}$ is the distance between a calibrating object $CO_2$ and the distance-measuring device 100. By means of the method illustrated in FIG. 2, the lighting component 120 is controlled to emit the detecting light $L_{ID}$ to the calibrating objects $CO_1$ and $CO_2$, so that the parameter-calculating circuit 150 can obtain the imaging location of the reflecting light $L_{RD}$ according to the light-sensed signals outputted by the images sensor 130 and accordingly calibrates the assembling error of the distance-measuring device 100.

First, it is assumed that the detecting light $L_{ID}$ emitted by the lighting component 120 rotates a lighting-error angle $\theta_{LD}$ because of the assembling error.

Figure 4:
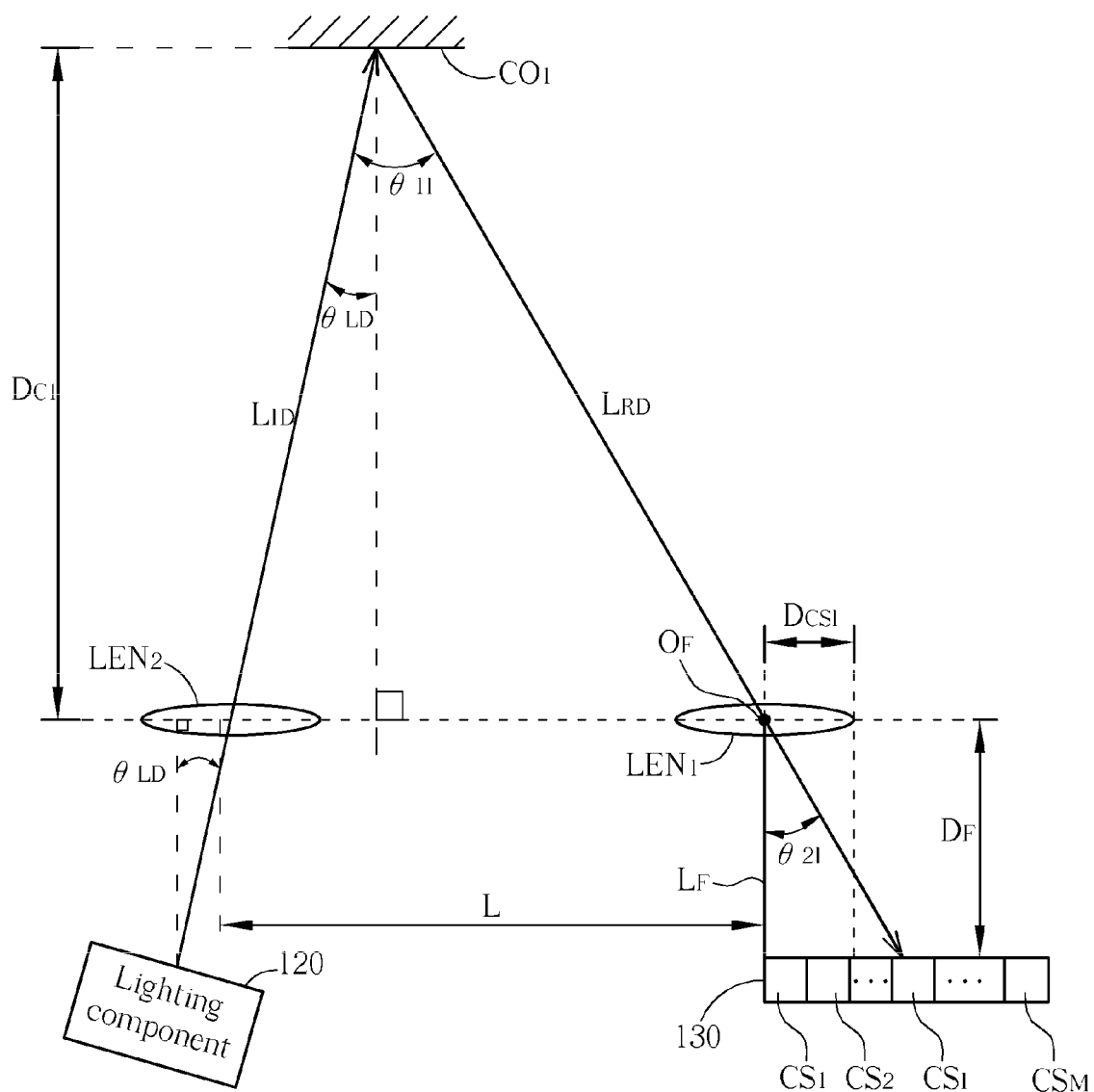
FIG. 4 is a diagram illustrating a calibrating method of calibrating the lighting-error angle of the detecting light emitted by the lighting-component.

Please refer to FIG. 4. FIG. 4 is a diagram illustrating a calibrating method of calibrating the lighting-error angle $\theta_{LD}$ of the detecting light $L_{ID}$ emitted by the lighting-component 120. The lighting/sensing controlling circuit 110 controls the lighting component 120 to emit the detecting light $L_{ID}$ to the calibrating object $CO_1$. The distance between the calibrating object $CO_1$ and the distance-measuring device 100 is the known distance $D_{C1}$. Since the detecting light $L_{ID}$ is affected by the assembling error of the lighting component 120, the detecting light $L_{ID}$ emits to the calibrating object $CO_1$ with a lighting-error angle $\theta_{LD}$, and the reflecting light $L_{RD}$ generated by the calibrating object $CO_1$ reflecting the detecting light $L_{ID}$ is focused to the sensing unit $CS_1$. The included angle between the detecting light $L_{ID}$ and the reflecting light $L_{RD}$ is $\theta_{11}$. The included angle between the straight line $L_F$ and the reflecting light $L_{RD}$ is $\theta_{21}$. As shown in FIG. 4, since the straight light $L_F$ is parallel to the surface normal of the calibrating object $CO_1$, $(\theta_{11}-\theta_{LD})$ is equal to $\theta_{21}$. That is, $\tan(\theta_{11}-\theta_{LD})$ is equal to $\tan\theta_{21}$. Therefore, the following formulas are obtained:

$$D_{C1}=1/[1/(D_F\times L)\times D_{CSI}+B] \quad (4);$$

$$B=\tan\theta_{LD}/L \quad (5);$$

wherein B represents the calibrating parameter for calibrating the lighting-error angle $\theta_{LD}$; $D_{CSI}$ represents the imaging location of the reflecting light $L_{RD}$. Thus, the parameter-calculating circuit 150 calculates the calibrating parameter B according to the formula (4). In this way, the parameter-calculating circuit 150 outputs the calibrating parameter B to the distance-calculating circuit 140 through the parameter signal $S_{AB}$, so that the distance-calculating circuit 140 calibrates the formula (2) to be the following formula for calculating the calibrated measured distance $D_M$:

$$D_M=1/[1/(D_F\times L)\times D_{CS}+B] \quad (6);$$

as a result, even the detecting light $L_{ID}$ emitted by the lighting component 120 rotates a lighting-error angle $\theta_{LD}$ because of the assembling-error, the distance-calculating circuit 140 still can correctly calculate the measured distance $D_M$, according to the calibrating parameter B, the focus length of the lens $LEN_1$, the predetermined distance L, and the imaging location $D_{CS}$ of the reflecting light $L_{RD}$ when the measured object MO is measured, by means of the parameter-calculating circuit 150 calculating the calibrating parameter B capable of calibrating the lighting-error angle $\theta_{LD}$.

Figure 5:
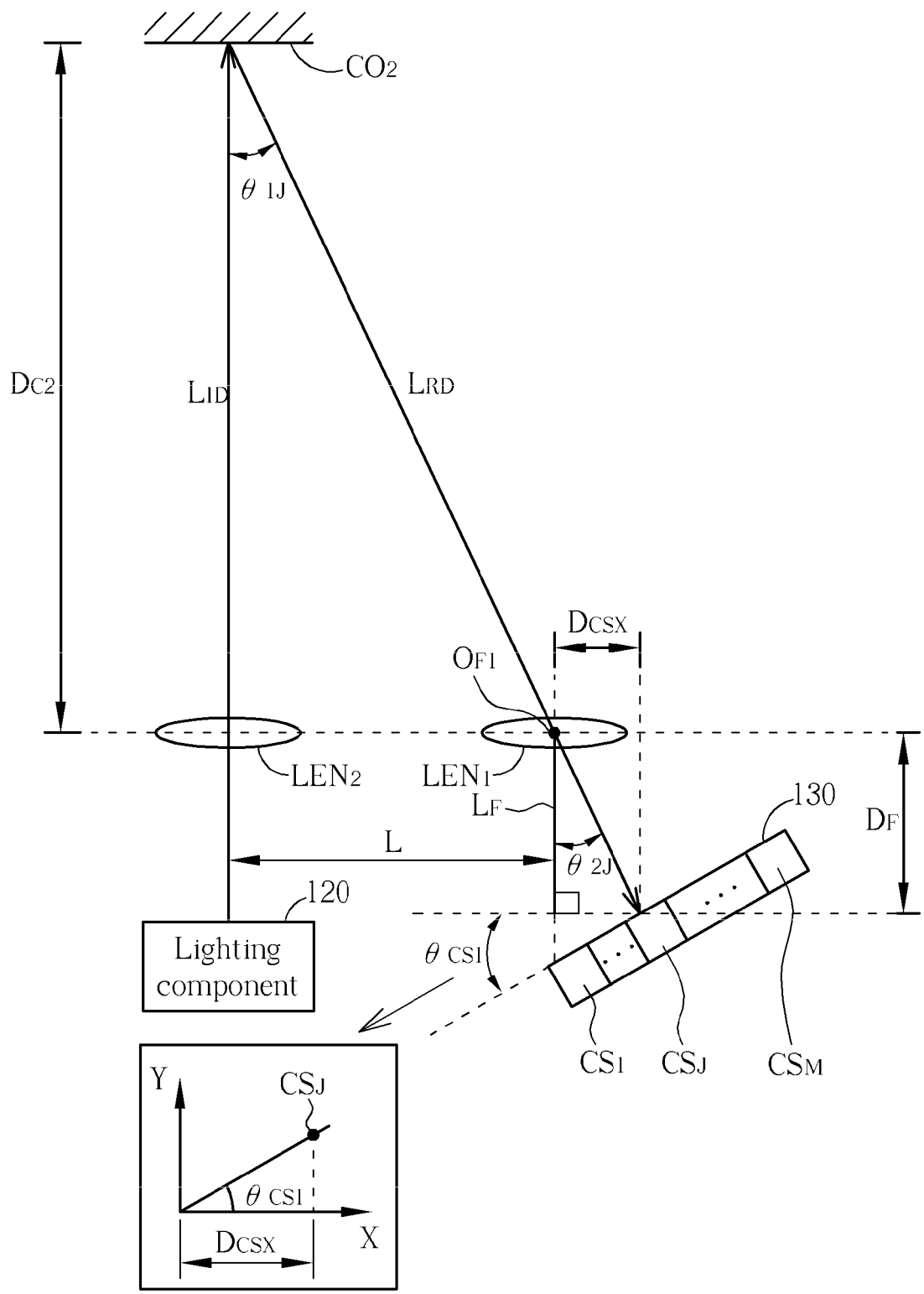
FIG. 5 and FIG. 6 are diagrams illustrating a calibrating method of calibrating sensing-error angles rotated by the image sensor because of the assembling error.
Figure 6:
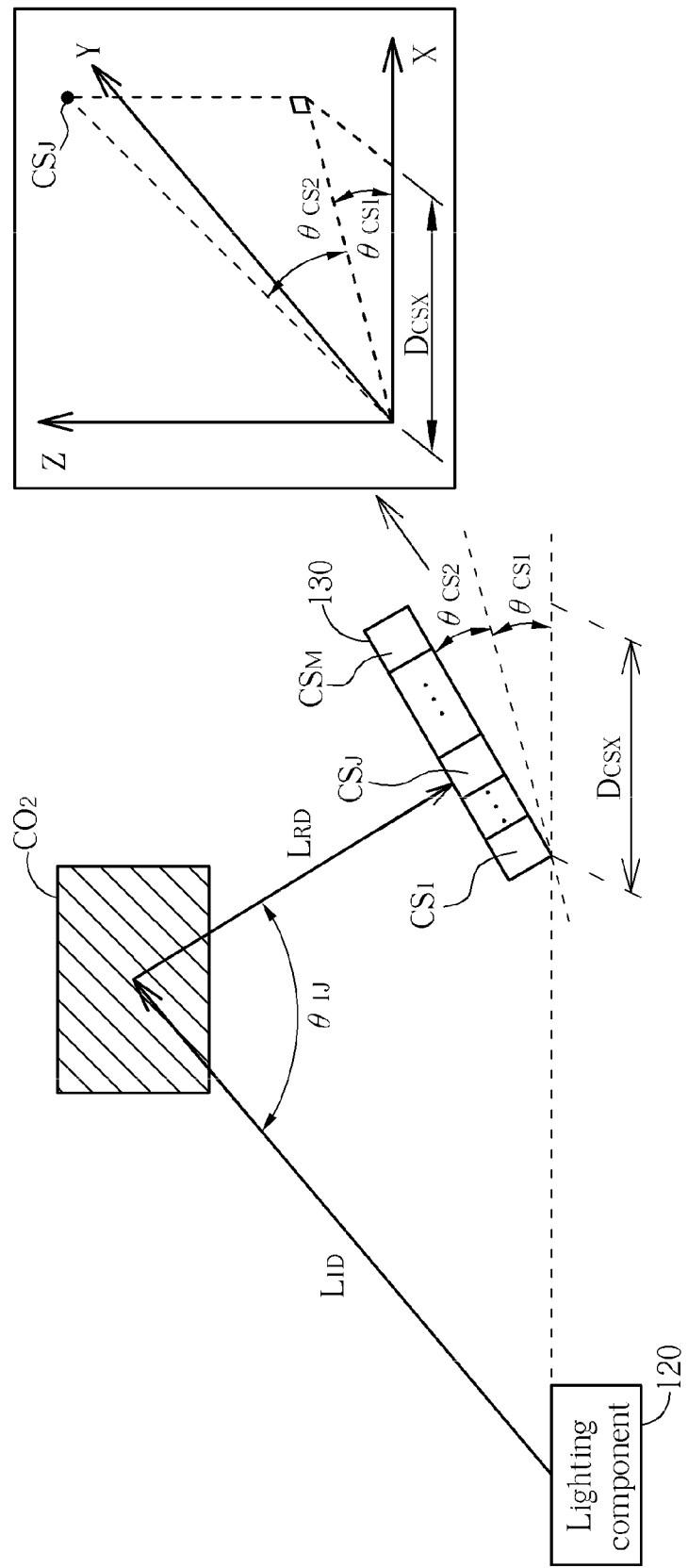

Please refer to FIG. 5 and FIG. 6. FIG. 5 and FIG. 6 are diagrams illustrating a calibrating method of calibrating sensing-error angles $\theta_{CS1}$ and $\theta_{CS2}$ rotated by the image sensor 130 because of the assembling error. FIG. 5 is a top view diagram of the distance-measuring device 100. As shown in FIG. 5, the sensing-error angle $\theta_{CS1}$ is on the XY plane. FIG. 6 is a side view diagram of the distance-measuring device 100. In addition, the sensing-error angles $\theta_{CS1}$ and $\theta_{CS2}$ are both shown in FIG. 6. The lighting/sensing controlling circuit 110 controls the lighting component 120 to emit the detecting light $L_{ID}$ to the calibrating object $CO_2$. The distance between the calibrating object $CO_2$ and the distance-measuring device 100 is the known distance $D_{C2}$. In FIG. 5 and FIG. 6, it is assumed that the lighting component 120 is assembled correctly (that is, the lighting-error angle $\theta_{LD}$ is zero). The detecting light $L_{ID}$ emits to the calibrating object $CO_2$, and the reflecting light $L_{RD}$ generated by the calibrating object $CO_2$ reflecting the detecting light $L_{ID}$ is focused to the sensing unit $CS_J$. The included angle between the detecting light $L_{ID}$ and the reflecting light $L_{RD}$ is $\theta_{1J}$. The included angle between the straight line $L_F$ and the reflecting light $L_{RD}$ is $\theta_{2J}$. It can be seen in FIG. 6 that $D_{CSX}$ is a projected distance projected by the imaging location $D_{CSX}$ of the reflecting light $L_{RD}$, and the relation between the imaging location $D_{CSX}$ and the projected distance $D_{CSX}$ is represented as the following formula:

$$D_{CSX}=D_{CSJ}\times\cos\theta_{CS2}\times\cos\theta_{CS1} \quad (6).$$

In FIG. 5, the straight line L is parallel to the detecting light $L_{ID}$. Consequently, the included angle $\theta_{2J}$ between the straight line $L_F$ and the reflecting light $L_{RD}$ is equal to the included angle $\theta_{1J}$ between the detecting light $L_{ID}$ and the reflecting light $L_{RD}$. That is, $\tan\theta_{1J}$ is equal to $\tan\theta_{2J}$. In this way, the relation between the known distance $D_{C2}$ and the projected distance $D_{CSX}$ is represented as the following formula:

$$L/D_{C2}=D_{CSX}/D_F \quad (7);$$

hence, the following formulas are obtained according to the formulas (6) and (7):

$$D_{C2}=1/(A\times D_{CSJ}) \quad (8);$$

$$A=(\cos\theta_{CS2}\times\cos\theta_{CS1})/(D_F\times L) \quad (9);$$

wherein A represents the calibrating parameter for calibrating the sensing-error angles $\theta_{CS2}$ and $\theta_{CS1}$. Thus, the parameter-calculating circuit 150 calculates the calibrating parameter A according to the formula (8). In this way, the parameter-calculating circuit 150 outputs the calibrating parameter A to the distance-calculating circuit 140 through the parameter signal $S_{AB}$, so that the distance-calculating circuit 140 calibrates the formula (2) to be the following formula for calculating the calculated measured distance $D_M$:

$$D_M=1/(A\times D_{CS}) \quad (10);$$

it can be seen that even the image sensor 130 rotates the sensing-error angles $\theta_{CS1}$ and $\theta_{CS2}$ because of the assembling error, the distance-calculating circuit 140 still can correctly calculate the measured distance $D_M$, according to the calibrating parameter A, and the imaging location $D_{CS}$ of the reflecting light $L_{RD}$ when the measured object MO is measured, by means of the parameter-calculating circuit 150 calculating out the calibrating parameter A capable of calibrating the sensing-error angles $\theta_{CS1}$ and $\theta_{CS2}$.

It is assumed that the detecting light $L_{ID}$ emitted by the lighting component 120 rotates the lighting-error angle $\theta_{LD}$, and the image sensor 130 also rotates the sensing-error angles $\theta_{CS1}$ and $\theta_{CS2}$, because of the assembling error of the distance-measuring device 100. The distance-measuring device 100 can obtain the imaging location $D_{CS1}$ of the reflecting light $L_{RD}$ corresponding to the calibrating object $CO_1$ and the imaging location $D_{CS2}$ of the reflecting light $L_{RD}$ corresponding to the calibrating object $CO_2$ by the lighting component 120 emitting the detecting light $L_{ID}$ to the calibrating objects $CO_1$ and $CO_2$, according to the illustration of FIG. 4, FIG. 5, and FIG. 6. The relations among the imaging locations $D_{CS1}$ and $D_{CS2}$, the known distance $D_{C1}$ between the distance-measuring device 100 and the calibrating object $CO_1$, the known distance $D_{C2}$ between the distance-measuring device 100 and the calibrating object $CO_2$, and the calibrating parameters A and B are represented as the following formulas:

$$D_{C1}=1/[A\times D_{CS1}+B] \quad (11);$$

$$D_{C2}=1/[A\times D_{CS2}+B] \quad (12);$$

the parameter-calculating circuit 150 calculates the calibrating parameter A capable of calibrating the sensing-error angles $\theta_{CS1}$ and $\theta_{CS2}$, and the calibrating parameter B capable of calibrating the lighting-error angles $\theta_{LD}$, according to the formulas (11) and (12). The parameter-calculating circuit 150 outputs the calibrating parameters A and B to the distance-calculating circuit 140 through the parameter signal $S_{AB}$, so that the distance-calculating circuit 140 calibrates the formula (2) to be the following formula for calculating the calculated measured distance $D_M$:

$$D_M = 1/[A \times D_{CS} + B] \tag{13}$$

in this way, even the detecting light $L_{ID}$ emitted by the lighting component 120 rotates the lighting-error angle $\theta_{LD}$, and the image sensor 130 rotates the sensing-error angles $\theta_{CS1}$ and $\theta_{CS2}$ at the same time, the distance-calculating circuit 140 still can correctly calculate the measured distance $D_M$ by the parameter-calculating circuit 150 calculating out the calibrating parameter A, which is capable of calibrating the sensing-error angles $\theta_{CS1}$ and $\theta_{CS2}$, and the calibrating parameter B, which is capable of calibrating the lighting-error angle $\theta_{LD}$.

In addition, according to the formula (13), when the distance-calculating circuit 140 calculates the measured distance $D_M$, only the calibrating parameters A and B, and the imaging location $D_{CS}$ of the reflecting light $L_{RD}$ when the measured object MO is measured are required. The focus length $D_F$ of the lens $LEN_1$ and predetermined distance L do not have to be known. In other words, even the focus length $D_F$ of the lens $LEN_1$ and predetermined distance L are affected because of the assembling error during the fabrication, the distance-calculating circuit 140 still can correctly calculates the measured distance $D_M$ according to the formula (13).

Figure 7:
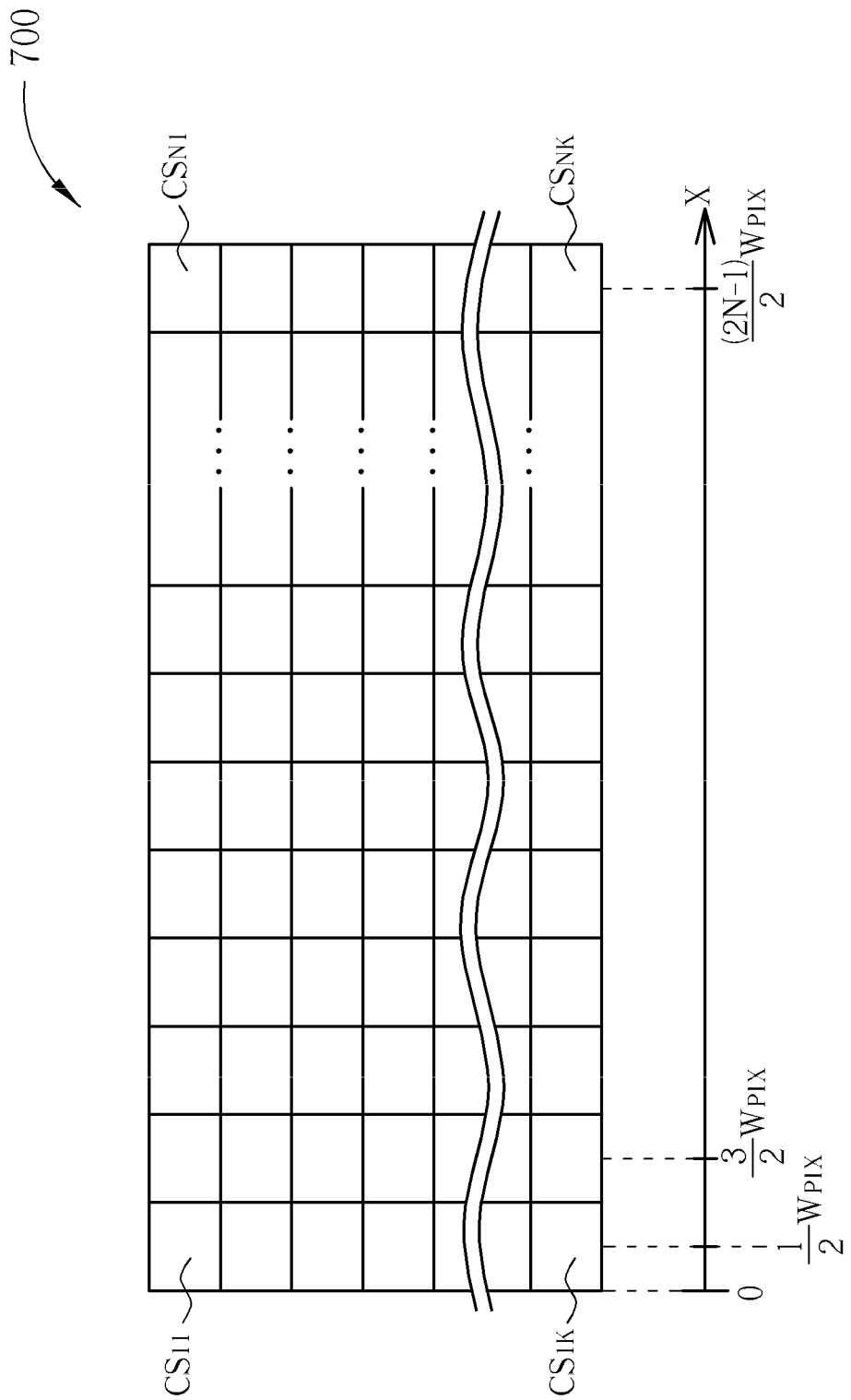
FIG. 7 is a diagram illustrating the structure of an image sensor according to a first embodiment of the present invention.

Please refer to FIG. 7. FIG. 7 is a diagram illustrating the structure of an image sensor 700 according to a first embodiment of the present invention. As shown in FIG. 7, the M sensing units of the image sensor 700 are arranged in N columns and K rows. In the image sensor 700, the horizontal locations (that is, the location in the horizontal direction or in the direction of the X-axis shown in FIG. 7) of the sensing units of the same column are the same. Moreover, it is assumed that the widths of the sensing units $CS_{11} \sim CS_{NK}$ are all equal to $W_{PIX}$ and the horizontal location of the left side of the sensing unit $CS_{11}$ is represented by zero. If the horizontal location of the sensing units of one column is represented by the center of the column, then the horizontal location of the sensing units $CS_{11} \sim CS_{1K}$ of the $1^{st}$ column is represented as $1/2 \times W_{PIX}$; the horizontal location of the sensing units $CS_{21} \sim CS_{2K}$ of the $2^{nd}$ column is represented as $3/2 \times W_{PIX}$; the horizontal location of the sensing units $CS_{N1} \sim CS_{NK}$ of the $N^{th}$ column is represented as $[(2 \times N-1) \times W_{PIX}]/2$, and so on. Therefore, in the image sensor 700, the horizontal locations of the sensing units of each row can be represented as $\{1/2 \times W_{PIX}, 3/2 \times W_{PIX}, \ldots, [(2 \times N-1) \times W_{PIX}]/2\}$, according to the above-mentioned illustration.

Figure 8:
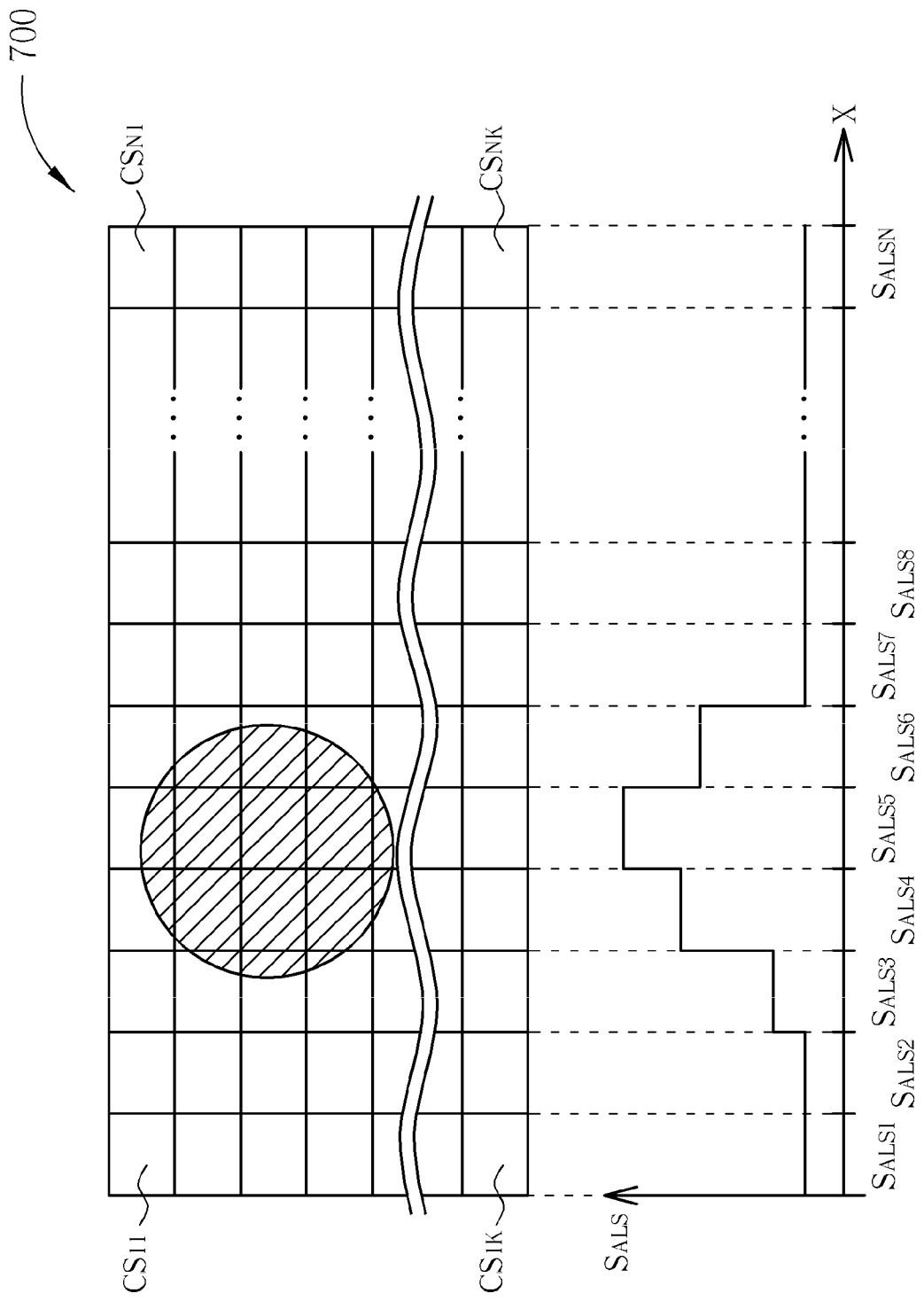
FIG. 8 is a diagram illustrating the operation principle of detecting the imaging location of the reflecting light by the image sensor of FIG. 7.

Please refer to FIG. 8. FIG. 8 is a diagram illustrating the operation principle of detecting the imaging location $D_{CS}$ of the reflecting light $L_{RD}$ by the image sensor 700. The circle shown in the upper part of FIG. 8 represents the imaging location $D_{CS}$ of the reflecting light $L_{RD}$ on the image sensor 700. That is, the sensing units inside the circle sense the energy of the reflecting light $L_{RD}$ so as to generate the light-sensed signals $S_{LS}$ having the larger values than the other sensing units. For obtaining the imaging location $D_{CS}$ of the reflecting light $D_{CS}$, the light-sensed signals $S_{LD}$ generated by sensing units of each column are respectively summed for obtaining the accumulated light-sensed signals $S_{ALS}$ for each column. For example, the accumulated light-sensed signal generated by summing the light-sensed signals of the sensing units $CS_{11} \sim CS_{1K}$ of the $1^{st}$ column is $S_{ALS1}$; the accumulated light-sensed signal generated by summing the light-sensed signals of the sensing units $CS_{21} \sim CS_{2K}$ of the $2^{nd}$ column is $S_{ALS2}$; the accumulated light-sensed signal generated by summing the light-sensed signals of the sensing units $CS_{N1} \sim CS_{NK}$ is of the $N^{th}$ column $S_{ALSN}$, and so on. Since the sensing units sensing the reflecting light $L_{RD}$ generate the light-sensed signals having the larger values, the sensing units near the imaging location $D_{CS}$ of the reflecting light $L_{RD}$ (that is, inside the circle) all generate the light-sensed signals having the larger values. In other words, among the accumulated light-sensed signals $S_{ALS1} \sim S_{ALSN}$, if the accumulated light-sensed signal $S_{ALSF}$, which corresponds to the sensing units $CS_{F1} \sim CS_{FK}$ of the $F^{th}$ column, has the maximum value, it represents that the imaging location $D_{CS}$ of the reflecting light $L_{RD}$ (that is, the center of the circle) is at the $F^{th}$ column. In this way, the horizontal direction of the $F^{th}$ column is utilized for representing the imaging location $D_{CS}$ of the reflecting light $L_{RD}$. For instance, as shown in FIG. 8, the accumulated light-sensed signal $S_{ALS5}$ corresponding to the sensing units $CS_{51} \sim CS_{5K}$ of $5^{th}$ column has the maximum value. Therefore, the imaging location $D_{CS}$ of the reflecting light $L_{RD}$ (that is, the center of the circle) is determined at the $5^{th}$ column. In this way, the horizontal location of the $5^{th}$ column ($9/2 \times W_{PIX}$) can represent the imaging location $D_{CS}$ of the reflecting light $L_{RD}$.

Figure 9:
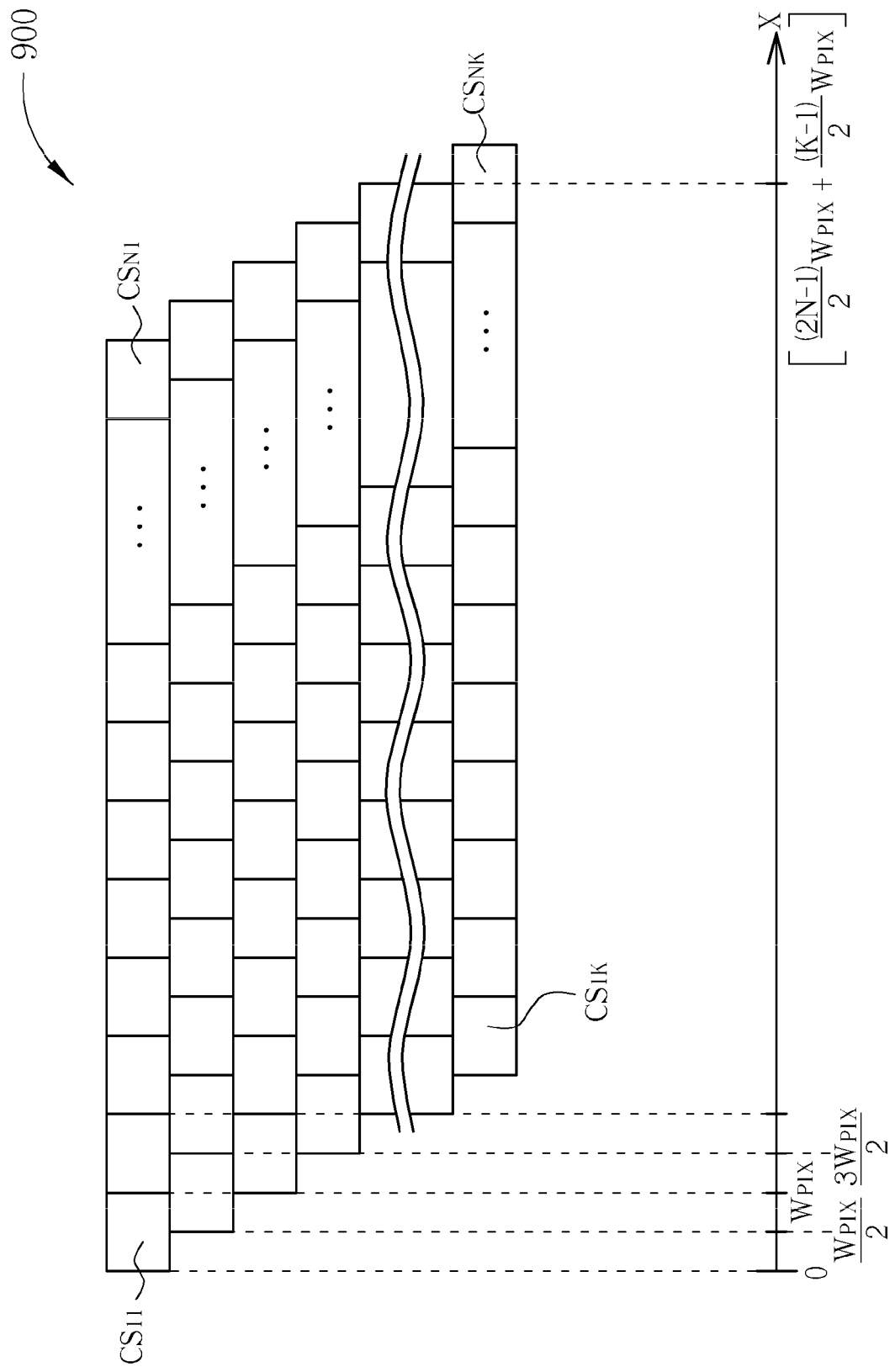
FIG. 9 is a diagram illustrating the structure of an image sensor according to another embodiment of the present invention.

Please refer to FIG. 9. FIG. 9 is a diagram illustrating the structure of an image sensor 900 according to another embodiment of the present invention. As shown in FIG. 9, the M sensing units of the image sensor 900 are arranged in N columns and K rows. Comparing with the image sensor 700, in the image sensor 900, the horizontal locations of each sensing unit of one row is shifted by a shifting distance $D_{SF}$, which is assumed to be $W_{PIX}/2$ in FIG. 9. For example, the horizontal locations of the sensing units $CS_{11} \sim CS_{N1}$ of the $1^{st}$ row can be represented as $\{1/2 \times W_{PIX}, 3/2 \times W_{PIX}, \ldots, [(2 \times N+1) \times W_{PIX}]/2\}$; the horizontal locations of the sensing units $CS_{12} \sim CS_{N2}$ of the $2^{nd}$ row can be represented as $\{W_{PIX}, 2 \times W_{PIX}, \ldots, [2 \times N \times W_{PIX}]/2\}$; the horizontal locations of the sensing units $CS_{1K} \sim CS_{NK}$ of the $K^{th}$ row can be represented as $\{[1/2+(K-1)/2] \times W_{PIX}, [3/2+(K-1)/2] \times W_{PIX}, \ldots, [(2 \times N-1)/2+(K-1)/2] \times W_{PIX}\}$, and so on.

Figure 10:
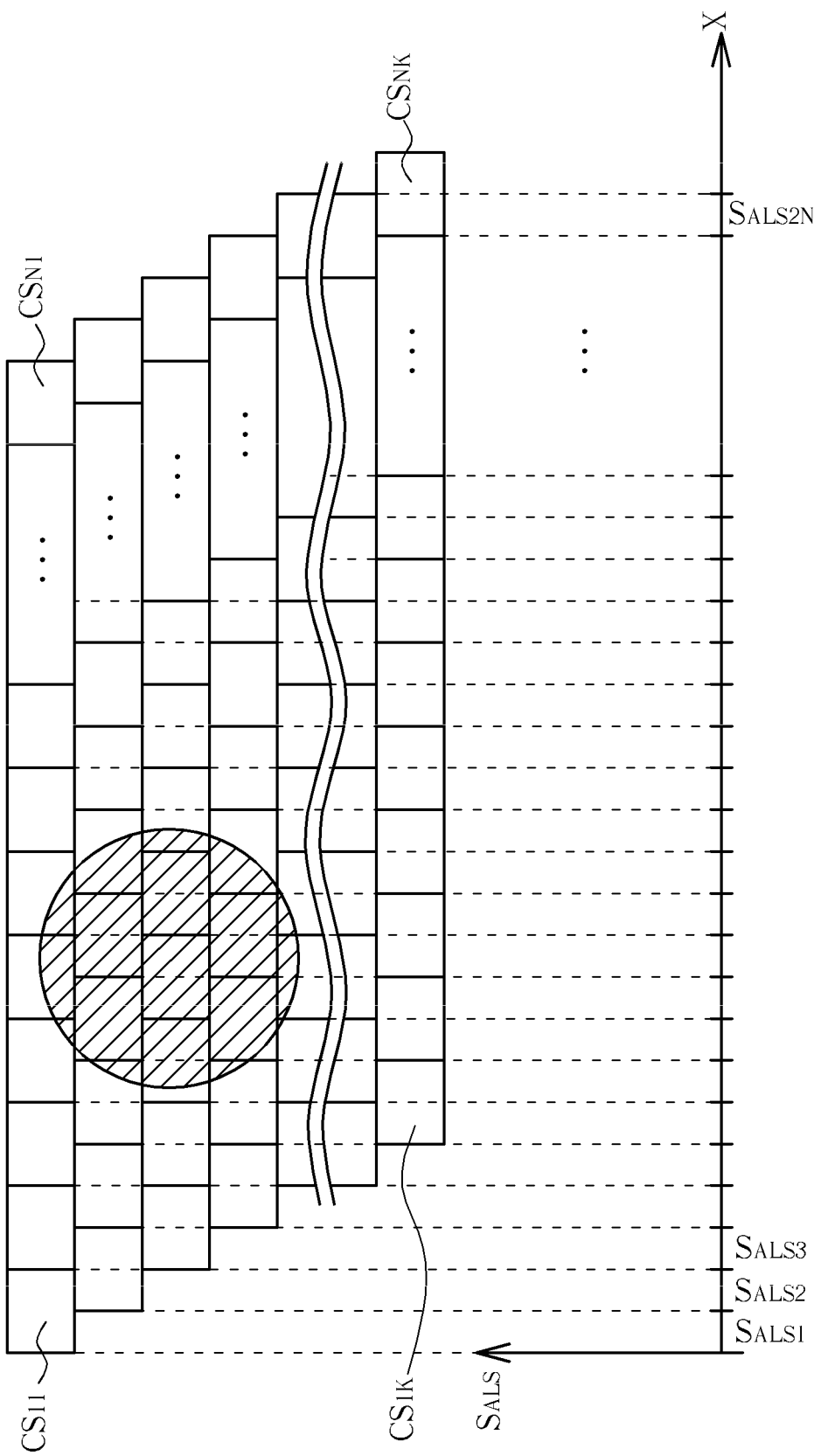
FIG. 10 is a diagram illustrating the operation principle of detecting the imaging location of the reflecting light by the image sensor of FIG. 9.

Please refer to FIG. 10. FIG. 10 is a diagram illustrating the operation principle of detecting the imaging location $D_{CS}$ of the reflecting light $L_{RD}$ by the image sensor 900. The circle shown in the upper part of FIG. 9 represents the imaging location of the reflecting light $L_{RD}$ on the image sensor 900. The accumulated light-sensed signals generated according to the light-sensed signals of the sensing units $CS_{11} \sim CS_{NK}$ of the image sensor 900 are $S_{ASL1} \sim S_{ALSN}$. The sensing range corresponding to the accumulated light-sensed signals $S_{ALS1}$ is the horizontal locations $0 \sim W_{PIX}/2$. Since among the sensing units $CS_{11} \sim CS_{NK}$, only the sensing range of the sensing unit $CS_{11}$ has a part in the sensing range corresponding to the accumulated light-sensed signals $S_{ALS1}$, the accumulated light-sensed signal $S_{ALS1}$ is equal to the value of the light-sensed signal generated by the sensing unit $CS_{11}$. The sensing range corresponding to the accumulated light-sensed signals $S_{ALS2}$ is $W_{PIX}/2 \sim W_{PIX}$. Since among the sensing units $CS_{11} \sim CS_{NK}$, the sensing range of the sensing unit $CS_{11}$ and the sensing range of the sensing unit $CS_{21}$ both have a part in the sensing range corresponding to the accumulated light-sensed signals $S_{ALS2}$, the accumulated light-sensed signal $S_{ALS1}$ is obtained by summing the light-sensed signals generated by the sensing unit $CS_{11}$ and $CS_{21}$. The other accumulated light-sensed signals can be obtained in similar way. Among the accumulated light-sensed signals $S_{ALS1} \sim S_{ALS2N}$, if the accumulated light-sensed signal $S_{ALSF}$ has the maximum value, it represents that the imaging location of the reflecting light $L_{RD}$ (that is, the center of the circle) is at the sensing units $CS_{F1}$~$CS_{FK}$ of the $F^{th}$ column. For instance, as shown in FIG. 10, the accumulated light-sensed signal $S_{ALS10}$ has the maximum value. Thus, the imaging location of the reflecting light $L_{RD}$ (that is, the center of the circle) is determined to be at the horizontal location of the accumulated light-sensed signal $S_{ALS10}$. Since the sensing range corresponding to the accumulated light-sensed signal $S_{ALS10}$ is $9/2 \times W_{PIX}$~$5 \times W_{PIX}$. Consequently, the horizontal location of the accumulated light-sensed signal $S_{ALS10}$ is represented as $19/4 \times W_{PIX}$. In this way, the horizontal location $19/4 \times W_{PIX}$ represents the imaging location $D_{CS}$ of the reflecting light $L_{RD}$.

Comparing with the image sensor 700, the image sensor 900 has a higher resolution. For example, when the image location $D_{CS}$ of the reflecting light $L_{RD}$ is detected by the image sensor 700, if the horizontal location of the image location $D_{CS}$ of the reflecting light $L_{RD}$ (the center of the circle) is actually $(17/4) \times W_{PIX}$, the accumulated light-sensed signal $S_{ALS5}$ has the maximum value. Therefore, the image location $D_{CS}$ of the reflecting light $L_{RD}$ is represented by the horizontal location $9/2 \times W_{PIX}$ of the $5^{th}$ column. However, if the horizontal location of the image location $D_{CS}$ of the reflecting light $L_{RD}$ (the center of the circle) changes to $(19/4) \times W_{PIX}$, the accumulated light-sensed signal $S_{ALS5}$ still has the maximum value. That is, although the actual horizontal location of the imaging location $D_{CS}$ of the reflecting light $L_{RD}$ has already changed from $(17/4) \times W_{PIX}$ to $(19/4) \times W_{PIX}$, the imaging location $D_{CS}$ of the reflecting light $L_{RD}$ is still represented as $9/2 \times W_{PIX}$ (the horizontal location of the $5^{th}$ column) by means of the image sensor 700. However, when the image location $D_{CS}$ of the reflecting light $L_{RD}$ is detected by the image sensor 900, if the horizontal location of the image location $D_{CS}$ of the reflecting light $L_{RD}$ (the center of the circle) is actually $(17/4) \times W_{PIX}$, the accumulated light-sensed signal $S_{ALS9}$ has the maximum value. Therefore, the image location $D_{CS}$ of the reflecting light $L_{RD}$ is represented by the horizontal location $17/4 \times W_{PIX}$ of the $9^{th}$ column. If the horizontal location of the image location $D_{CS}$ of the reflecting light $L_{RD}$ (the center of the circle) changes to $(19/4) \times W_{PIX}$, the accumulated light-sensed signal $S_{ALS10}$ has the maximum value. As a result, the image location $D_{CS}$ of the reflecting light $L_{RD}$ is represented by the horizontal location $19/4 \times W_{PIX}$ of the $10^{th}$ column. Consequently, the imaging location $D_{CS}$ of the reflecting light $L_{RD}$ are more accurately detected by the image sensor 900. In conclusion, by shifting the horizontal locations of each sensing unit of the same column, the image sensor 900 has the higher resolution than the image sensor 700.

However, in the image sensor 900, the shifting distances between the adjacent rows of the sensing units do not have to be the same. For example, the shifting distance between the $1^{st}$ and the $2^{nd}$ rows of the sensing units is $W_{PIX}/2$; the shifting distance between the $2^{nd}$ and the $3^{rd}$ rows of the sensing units is $W_{PIX}/4$. By such organization, the imaging location $D_{CS}$ of the reflecting light $L_{RD}$ still can be detected by the method illustrated in FIG. 10.

Figure 11:
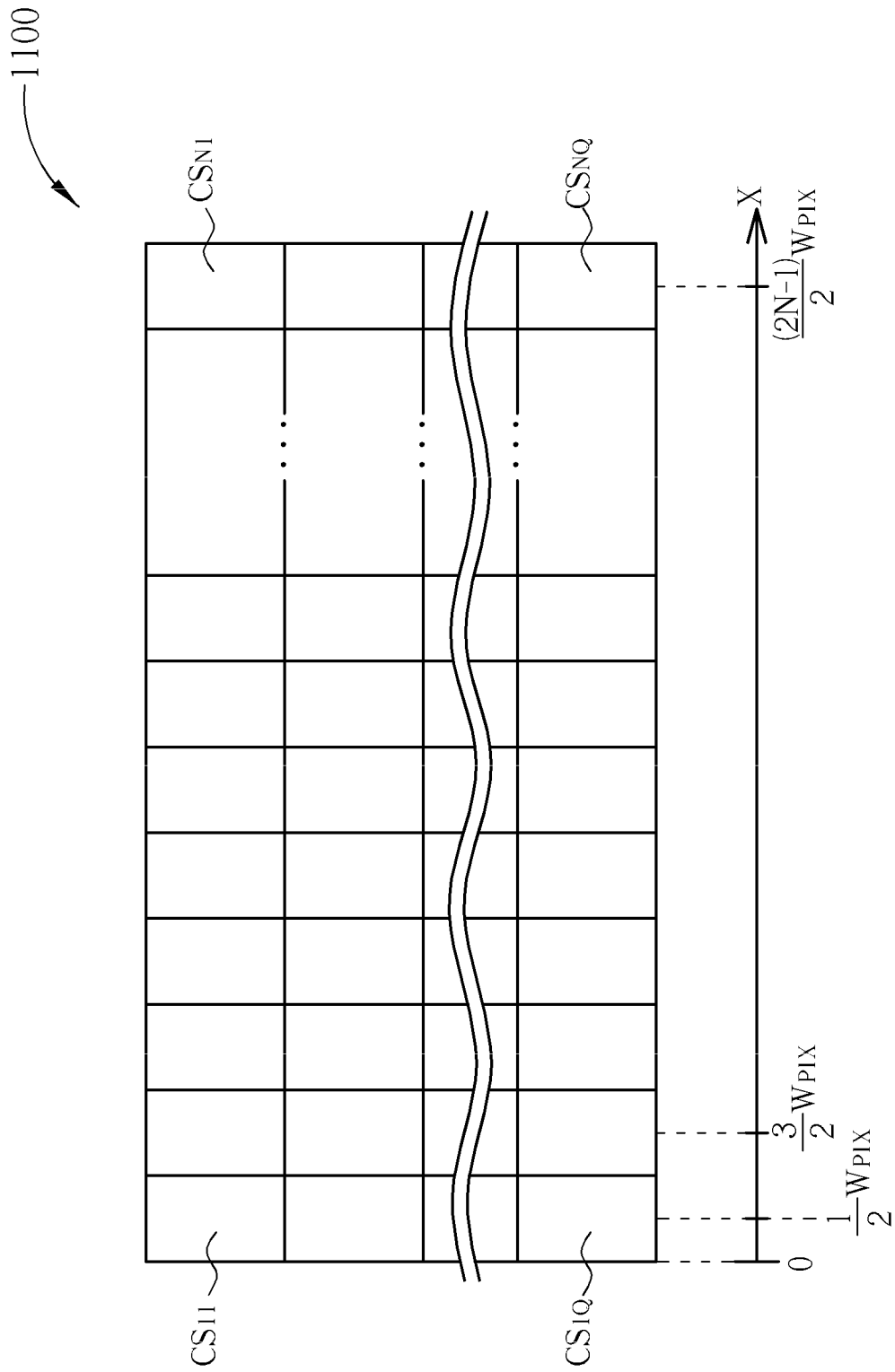
FIG. 11 is a diagram illustrating the structure of an image sensor according to another embodiment of the present invention.

Please refer to FIG. 11. FIG. 11 is a diagram illustrating the structure of an image sensor 1100 according to another embodiment of the present invention. As shown in FIG. 11, the M sensing units of the image sensor 1100 are arranged in N columns and Q rows. Comparing the image sensor 1100 with the image sensor 700, it can be understood that each sensing unit in the image sensor 700 is a square. However, each sensing unit in the image sensor 1100 is a rectangle. For instance, both the width and the height of each sensing unit of image sensor 700 are equal to $W_{PIX}$, but, the width of each sensing unit of image sensor 1100 is $W_{PIX}$ and the height of each sensing unit of image sensor 1100 is $(W_{PIX} \times K/Q)$, wherein Q<K. That is, the long side of each sensing unit of image sensor 1100 is in the vertical direction, and the short side of each sensing unit of image sensor 1100 is in the horizontal direction (the X-axis direction). In other words, each sensing unit of image sensor 1100 has the same width as the each sensing unit of image sensor 700. Although the number Q is smaller than the number K, the total area of the sensing units of one column of the image sensor 1100 is still equal to the total area of the sensing units of one column of the image sensor 700. Similar to the image sensor 700, the image sensor 1100 also provides M light-sensed signals generated by the M sensing units to the distance-calculating circuit 140, so that the distance-calculating circuit 140 calculates the accumulated light-sensed signals $S_{ALS1}$~$S_{ALSN}$. For example, the accumulated light-sensed signal generated by summing the light-sensed signals of the sensing units $CS_{11}$~$CS_{1Q}$ of the $1^{st}$ column is $S_{ALS1}$; the accumulated light-sensed signal generated by summing the light-sensed signals of the sensing units $CS_{21}$~$CS_{2Q}$ of the $2^{nd}$ column is $S_{ALS2}$; the accumulated light-sensed signal generated by summing the light-sensed signals of the sensing units $CS_{N1}$~$CS_{NQ}$ of the $N^{th}$ column is $S_{ALSN}$, and so on. In this way, the distance-calculating circuit 140 obtains the imaging location $D_{CS}$ of the reflecting light $L_{RD}$ according to the accumulated light-sensed signals $S_{ALS1}$~$S_{ALSN}$ by the method illustrated in FIG. 8, and accordingly calculates the measured distance $D_M$.

Comparing with the image sensor 700, it can be seen that in the image sensor 1100, the side of each sensing unit in the vertical direction is longer, so that the number of sensing units of one column is reduced (that is Q<K). Therefore, the number of the accumulating times which the distance-calculating circuit 140 generates the accumulated light-sensed signals $S_{ALS1}$~$S_{ALSN}$, is reduced as well. Since the total area of the sensing units of one column of the image sensor 1100 is the same as the total area of the sensing units of one column of the image sensor 700, the received energy of the sensing units of each column sensing the light focused by the lens $LEN_1$ remains unchanged. In other words, when the imaging location $D_{CS}$ of the reflecting light $L_{RD}$ is measured by means of the image sensor 1100, the computation of the distance-calculating circuit 140 generating the accumulated light-sensed signals $S_{ALS1}$~$S_{ALSN}$ is reduced, and the noise-to-signal ratios of the accumulated light-sensed signals $S_{ALS1}$~$S_{ALSN}$ are maintained at the same time. In addition, the short side of the sensing units of each column of the image sensor 1100 is in the horizontal direction and the width of each column sensing units is $W_{PIX}$. In other words, when the imaging location $D_{CS}$ of the reflecting light $L_{RD}$ is measured, the image sensor 1100 has the same resolution as the image sensor 700. Thus, comparing with the image sensor 700, it can be seen that the image sensor 1100 reduces the computation of the distance-calculating circuit 140 generating the accumulated light-sensed signals $S_{ALS1}$~$S_{ALSN}$ and maintains the resolution of the imaging location $D_{CS}$ in the horizontal direction (that is, the direction of the short side) and the signal-to-noise ratios of the accumulated light-sensed signals as well.

In conclusion, the distance-measuring device provided by the present invention reduces the effect of the background light and the flicker phenomenon by means of removing the parts corresponding to the background light and the flicking light from the light-sensed signals generated by the image sensor. In the image sensor of the present invention, the resolution is improved by shifting the sensing units of adjacent rows. In addition, the present invention further provides a calibrating method of the distance-measuring device. The first imaging location corresponding to the first calibrating object and the second imaging location corresponding to the second calibrating object are respectively obtained by means of the lighting component emits the detecting light to the first calibrating object with the first known distance and to the second calibrating object with the second known distance. The calibrating parameters capable of calibrating the assembling error of the distance-measuring device are calculated out according to the first and the second imaging location, and the first and the second known distance. In this way, the distance-measuring device correctly calculates the measured distance by means of the calibrating parameters, providing a great convenience.

Those skilled in the art will readily observe that numerous modifications and alterations of the device and method may be made while retaining the teachings of the invention.

What is claimed is:

1. A distance-measuring device of measuring distance according to variation of imaging location, the distance-measuring device having a lighting component, a first lens, and an image sensor, the lighting component utilized for emitting a detecting light to a measured object for the measured object generating a reflecting light, the first lens utilized for focusing a background light or the reflecting light, the image sensor utilized for sensing an energy of a light focused by the first lens so as to generate M light-sensed signals, the distance-measuring device comprising:

a lighting/sensing controlling circuit, for controlling the lighting component to emit the detecting light and controlling the image sensor to sense the energy of the light focused by the first lens during a distance-sensing phase, so that the image sensor generates M first light-sensed signals, and for controlling the lighting component not to emit the detecting light and controlling the image sensor to sense the energy of the light focused by the first lens during a noise-sensing phase, so that the image sensor generates M second light-sensed signals;

wherein M represents a positive integer; and a distance-calculating circuit, for determining an imaging location of the reflecting light on the image sensor according to the M first light-sensed signals and the M second light-sensed signals, and calculating a measured distance between the distance-measuring device and the measured object according to the imaging location, a focus length of the first lens, and a predetermined distance between the lighting component and the image sensor;

wherein the lighting/sensing controlling circuit controls the lighting component to emit the detecting light to the measured object by generating a lighting pulse signal, so that the measured object generates the reflecting light; the lighting/sensing controlling circuit controls the image sensor to sense the energy of the light focused by the first lens by generating a shutter pulse signal, so that the image sensor generates the M light-sensed signals; the lighting/sensing controlling circuit controls the image sensor to output the M light-sensed signals to the distance-calculating circuit by generating a reading signal; the lighting/sensing controlling circuit controls the distance-calculating circuit to receive the M light-sensed signals by generating a phase signal, for the distance-calculating circuit determining the image location of the reflecting light on the image sensor, and calculating the measured distance between the distance-measuring device and the measured object according to the imaging location, the focus length of the first lens, and the predetermined distance between the lighting component and the image sensor.

2. The distance-measuring device of claim 1, wherein the image sensor comprises:

M sensing units arranged in Q rows in a first direction and in N columns in a second direction, and respectively utilized for sensing the energy of the light focused by the first lens according to the shutter pulse signal and accordingly generating the M light-sensed signals, the M sensing units outputting the M light-sensed signals according to the reading signal;

wherein the distance-calculating circuit generates N accumulated light-sensed signals according to the M light-sensed signals and calculating the measured distance of the measured object according to the N accumulated light-sensed signals;

wherein the distance-calculating circuit accumulates light-sensed signals generated by Q sensing units of an $H^{th}$ column of the M sensing units for generating an $H^{th}$ accumulated light-sensed signal of the N accumulated light-sensed signals;

wherein each of the M sensing units is a rectangle; a side of each column of the M sensing units is longer in the first direction, for reducing number of sensing units of each column of the M sensing units and maintaining the received energy of each column of the M sensing units sensing the light focused by the first lens, so that accumulating times that the distance-calculating circuit generates the N accumulated light-sensed signals is reduced and noise-to-signal ratios of the N accumulated light-sensed signals remain unchanged; a short side of each column of the M sensing units is in the second direction, for maintaining a resolution of the image sensor in the second direction;

wherein N, Q, and H all represent a positive integer respectively, and $1 \leq H \leq N$.

3. The distance-measuring device of claim 1, wherein the image sensor comprises:

M sensing units, respectively for sensing the energy of the light focused by the first lens according to the shutter pulse signal so as to generate the M light-sensed signals, and outputting the M light-sensed signals according to the reading signal.

4. The distance-measuring device of claim 3, wherein the M sensing units of the image sensor are arranged in N columns and K rows; a location of an $X^{th}$ row of the M sensing units is shifted by a shifting distance from a location of an adjacent $(X+1)^{th}$ row of the M sensing units; X, N, and K all represent a positive integer respectively, and $1 \leq X \leq (K-1)$.

5. The distance-measuring device of claim 3, wherein the distance-calculating circuit comprises:

a plurality of storing units, respectively for storing the M first light-sensed signals and the M second light-sensed signals;

wherein when the phase signal represents sum, the distance-calculating circuit marks the received M first light-sensed signals as M positive light-sensed signals;

wherein when the phase signal represents noise, the distance-calculating circuit marks the received M second light-sensed signals as M negative light-sensed signals;

wherein when the phase signal represents distance-calculating, the distance-calculating circuit deducts the negative light-sensed signals stored in the plurality of the storing units from the positive light-sensed signals stored in the plurality of the storing units; the distance-calculating circuit selects a storing unit having a maximum stored value so as to determine the imaging location of the reflecting light on the image sensor, and calculates the measured distance between the distance-measuring device and the measured object according to the imaging location, the focus length of the first lens, and the predetermined distance between the lighting component and the image sensor.

6. The distance-measuring device of claim 5, wherein during the distance-sensing phase, the lighting/sensing controlling circuit generates the lighting pulse signal and the shutter pulse signal, and then generates the reading signal and the phase signal representing sum; during the noise-sensing phase, the lighting/sensing controlling circuit generates the shutter pulse signal, and then generates the reading signal and the phase signal representing noise.

7. The distance-measuring device of claim 6, wherein when the lighting pulse signal represents lighting, the lighting component emits the detecting light; when the shutter pulse signal represents turning-on, the M sensing units sense the energy of the light focused by the first lens; when the reading signal represents reading, the M sensing units respectively output the M first light-sensed signals or the M second light-sensed signals.

8. The distance-measuring device of claim 7, wherein during the distance-sensing phase, the lighting/sensing controlling circuit generates the lighting pulse signal representing lighting and the shutter pulse signal representing turning-on, and then generates the reading signal representing reading and the phase signal representing sum; wherein during the distance-sensing phase, a pulse width of the lighting pulse signal representing lighting and a pulse width of the shutter pulse signal representing turning-on are both equal to a first predetermined pulse width.

9. The distance-measuring device of claim 8, wherein during the noise-sensing phase, the lighting/sensing controlling circuit generates the shutter pulse signal representing turning-on, and then generates the reading signal representing reading and the phase signal representing noise; wherein during the noise-sensing phase, the pulse width of the shutter pulse signal representing turning-on is equal to the first predetermined pulse width.

10. The distance-measuring device of claim 7, wherein during the distance-sensing phase, a pulse width of the reading signal representing reading and a pulse width of the reading signal representing reading are both equal to a second predetermined pulse width.

11. The distance-measuring device of claim 6, wherein number of the plurality of the storing units is equal to M; the distance-calculating circuit determines the reflecting light mainly focuses to a $K^{th}$ sensing unit of the M sensing units based on a $K^{th}$ storing unit of the M storing sensing units having a maximum stored value;

wherein K represents a positive integer, and $K \leq M$.

12. The distance-measuring device of claim 11, wherein the distance-calculating circuit calculates the imaging location according to a following formula, based on the $K^{th}$ storing unit of the M storing sensing units having the maximum stored value:

$$D_{CS} = K \times W_{PIX};$$

wherein $D_{CS}$ represents the imaging location, $W_{PIX}$ represents a pixel width;

wherein a width of each sensing unit of the M sensing units is equal to the pixel width.

13. The distance-measuring device of claim 12, wherein when the phase signal represents distance-calculating, the distance-calculating circuit calculates the measured distance according to a following formula:

$$D_M = (D_F \times L)/D_{CS};$$

wherein $D_M$ represents the measured distance, $D_F$ represents the focus length of the first lens, L represents the predetermined distance between the lighting component and the image sensor.

14. The distance-measuring device of claim 12, further comprising:
a second lens, for focusing the detecting light emitting to the measured object.

15. The distance-measuring device of claim 1, wherein a time interval between the distance-measuring phase and the noise-measuring phase is equal to a half of an AC cycle.

16. The distance-measuring device of claim 15, wherein a half of the AC cycle is equal to 0.0083 second.

17. A distance-measuring device of measuring distance according to variation of imaging location, the distance-measuring device having a lighting component, a first lens, and an image sensor, the lighting component utilized for emitting a detecting light to a measured object for the measured object generating a reflecting light, the first lens utilized for focusing a background light or the reflecting light, the image sensor utilized for sensing an energy of a light focused by the first lens so as to generate M light-sensed signals, the distance-measuring device comprising:
a lighting/sensing controlling circuit, for controlling the lighting component to emit the detecting light and controlling the image sensor to sense the energy of the light focused by the first lens during a distance-sensing phase, so that the image sensor generates M first light-sensed signals, and for controlling the lighting component not to emit the detecting light and controlling the image sensor to sense the energy of the light focused by the first lens during a noise-sensing phase, so that the image sensor generates M second light-sensed signals;
wherein M represents a positive integer;
a distance-calculating circuit, for determining an imaging location of the reflecting light on the image sensor according to the M first light-sensed signals and the M second light-sensed signals, and calculating a measured distance between the distance-measuring device and the measured object according to the imaging location, a focus length of the first lens, and a predetermined distance between the lighting component and the image sensor; and
a parameter-calculating circuit, for receiving a known-distance signal outputted by the lighting/sensing controlling circuit so as to obtain a known distance between a calibrating object and the distance-measuring device, and calculating a calibrating parameter for calibrating an assembling-error angle of the distance-measuring device according to the known distance and a first imaging location of the reflecting light when the calibrating object is measured, the parameter-calculating circuit outputting a parameter signal to the distance-calculating circuit according to the calibrating parameter;
wherein the parameter-calculating circuit obtains the first imaging location of the reflecting light when the calibrating object is measured according to the light-sensed signal outputted by the image sensor.

18. The distance-measuring device of claim 17, wherein the assembling-error angle represents a lighting-error angle rotated by the detecting light.

19. The distance-measuring device of claim 18, wherein the parameter-calculating circuit calculates the calibrating parameter according to a following formula:

$$D_{C1} = 1/[1/(D_F \times L) \times D_{CSI} + B];$$

wherein $D_{C1}$ represents the known distance; $D_{CSI}$ represents the first imaging location; B represents the calibrating parameter; $D_F$ represent the focus length of the first lens; L represent the predetermined distance between the lighting component and the image sensor.

20. The distance-measuring device of claim 19, wherein relation between the calibrating parameter and the lighting-error angle is represented as a following formula:

$$B = \tan\theta_{LD}/L;$$

Wherein $\theta_{LD}$ represents the lighting-error angle.

21. The distance-measuring device of claim 19, wherein when the distance-calculating circuit receives the calibrating parameter, the distance-measuring circuit calculates the calibrated measured distance according to a following formula:

$$D_M = 1/[1/(D_F \times L) \times D_{CS} + B];$$

wherein $D_M$ represents the measured distance; $D_F$ represents the focus length of the first lens; L represents the predetermined distance between the lighting component and the image sensor; $D_{CS}$ represents the imaging location of the reflecting light when the measured object is measured.

22. The distance-measuring device of claim 17, wherein the assembling-error angle represents a first sensing-error angle and a second sensing-error angle of the image sensor.

23. The distance-measuring device of claim 22, wherein the parameter-calculating circuit calculates the calibrating parameter according to a following formula:

$$D_{C2} = 1/(A \times D_{CSJ});$$

wherein $D_2$ represents the known distance; $D_{CSJ}$ represents the first imaging location; A represents the calibrating parameter.

24. The distance-measuring device of claim 23, wherein relation among the calibrating parameter, the first sensing-error angle, and the second sensing-error angle is represented as a following formula:

$$A = (\cos\theta_{CS2} \times \cos\theta_{CS1})/(D_F \times L);$$

wherein $\theta_{CS1}$ represents the first sensing-error angle; $\theta_{CS2}$ represents the second sensing-error angle.

25. The distance-measuring device of claim 23, wherein when the distance-calculating circuit receives the calibrating parameter, the distance-measuring circuit calculates the calibrated measured distance according to a following formula:

$$D_M = 1/(A \times D_{CS});$$

wherein $D_M$ represents the measured distance; $D_{CS}$ represents the imaging location of the reflecting light when the measured object is measured.

\* \* \* \* \*